July 11, 1939.  T. M. BUTLER  2,165,340
CALCULATING MACHINE
Filed Oct. 12, 1935   21 Sheets-Sheet 3

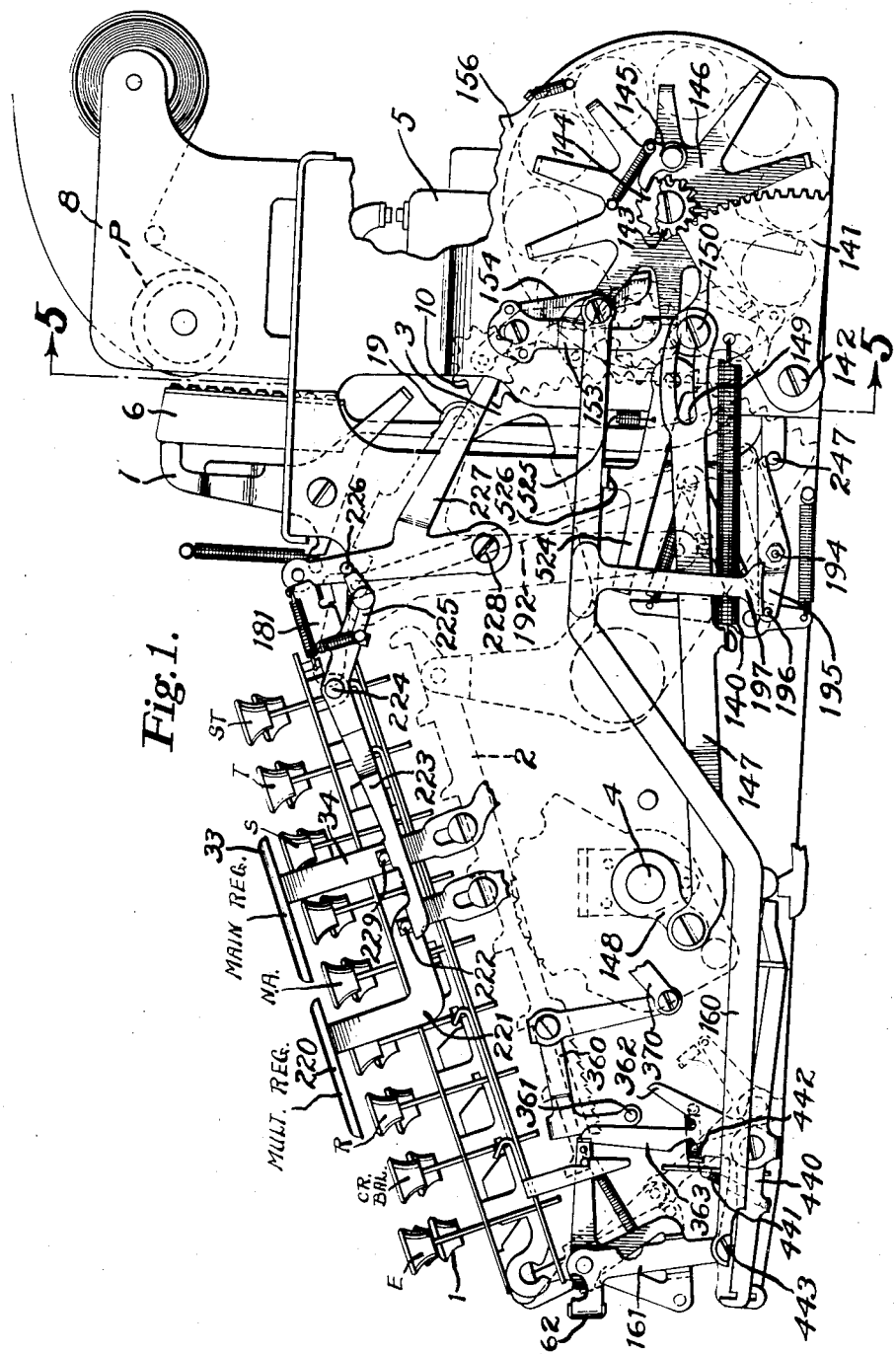

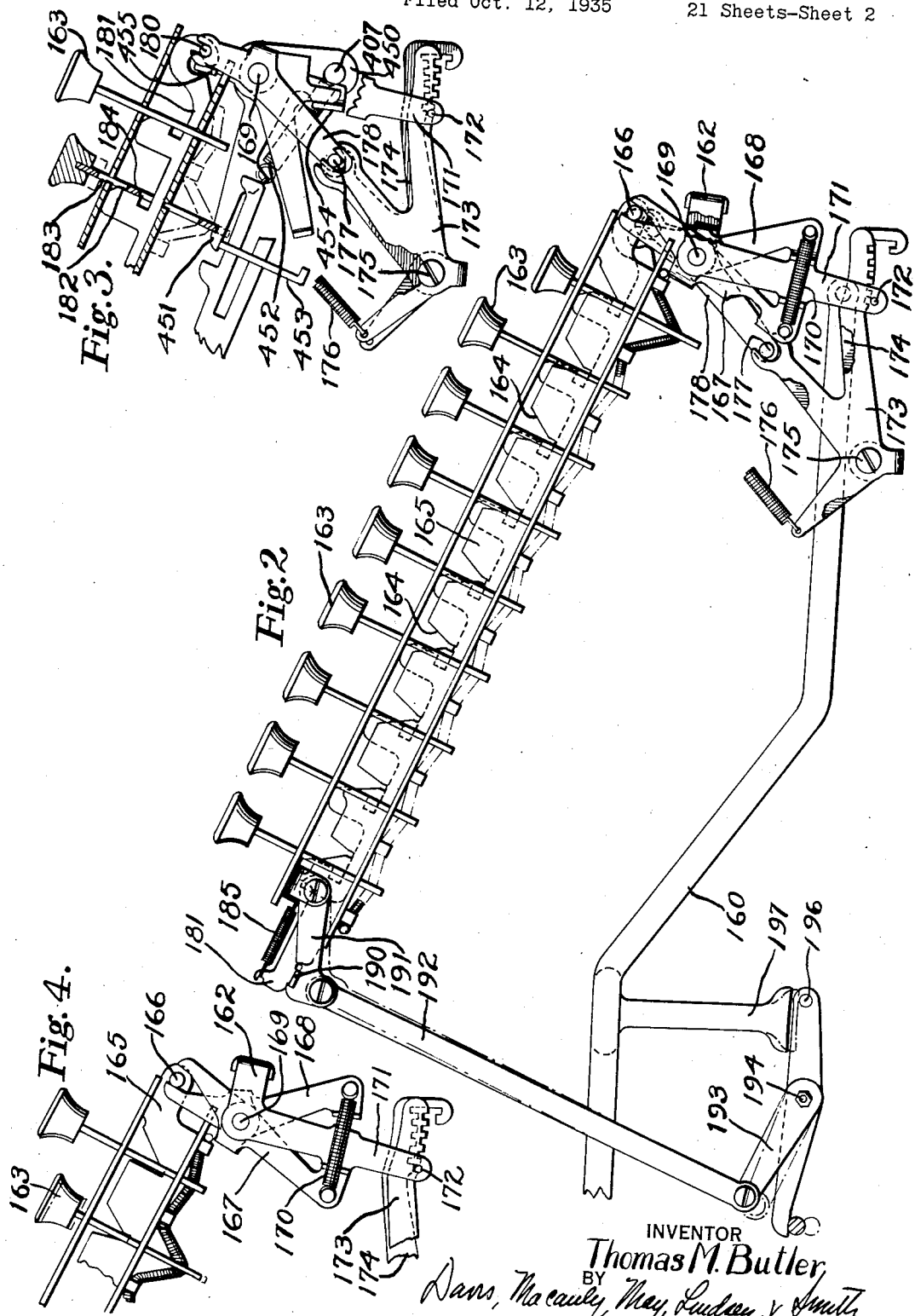

INVENTOR
Thomas M. Butler
BY
ATTORNEYS

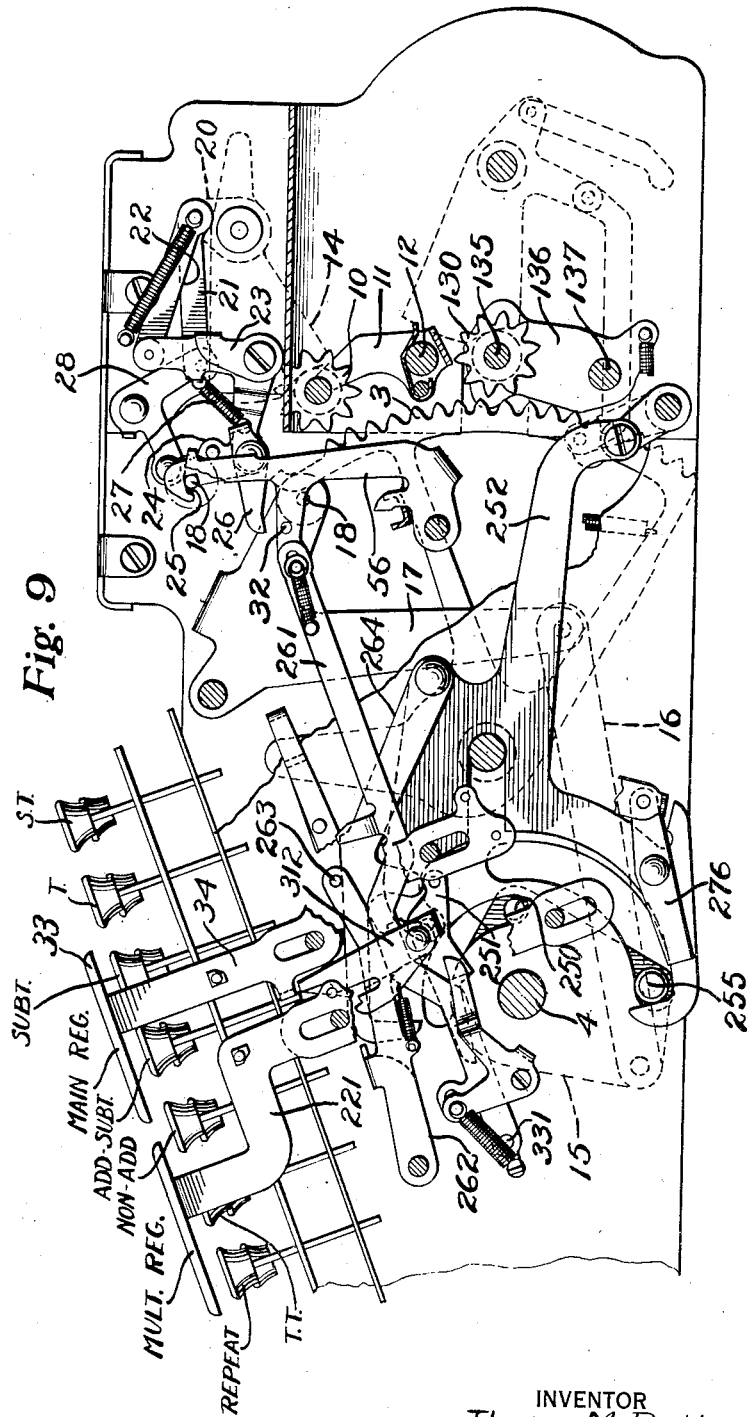

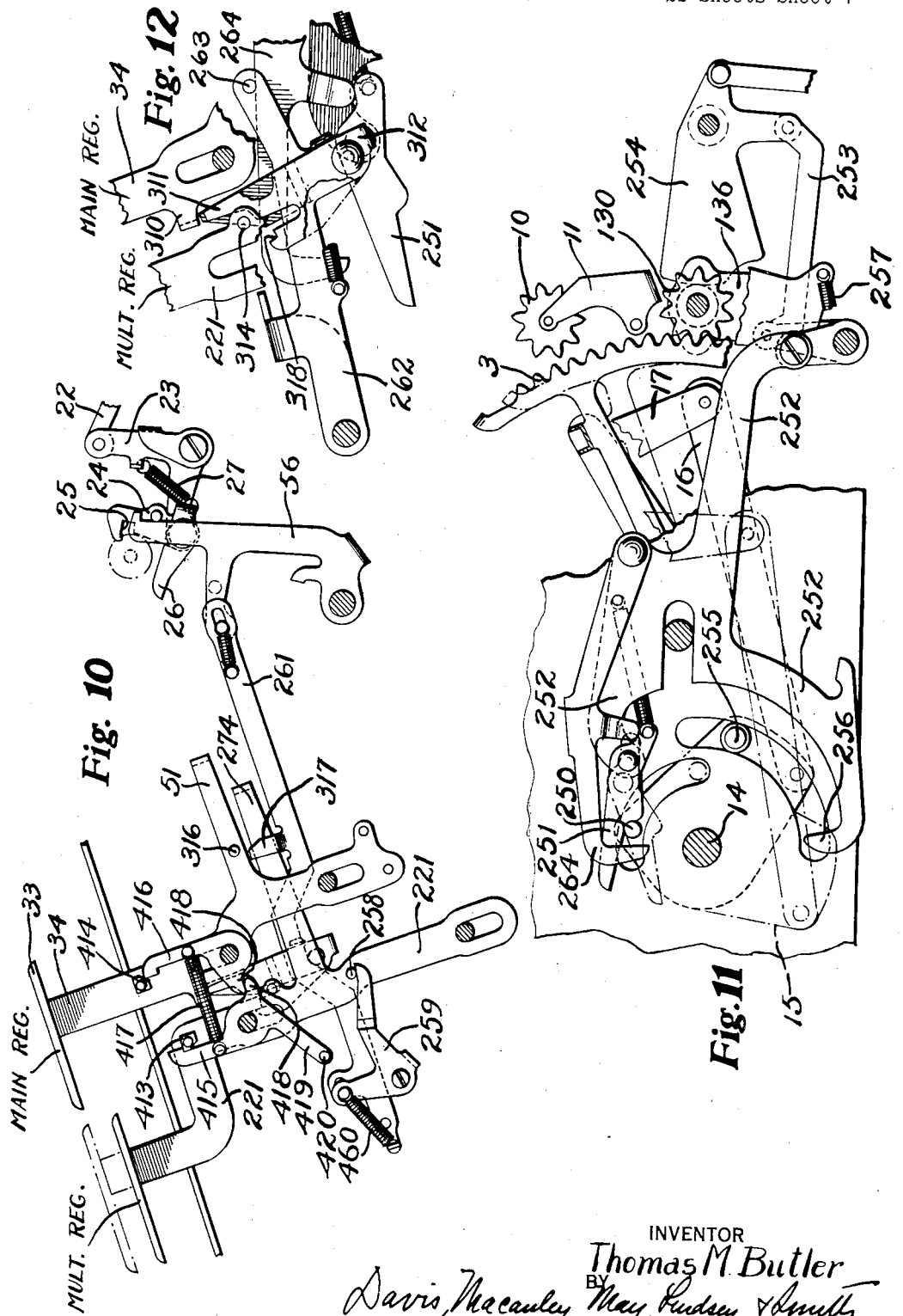
July 11, 1939.  T. M. BUTLER  2,165,340
CALCULATING MACHINE
Filed Oct. 12, 1935  21 Sheets-Sheet 7
INVENTOR
Thomas M. Butler
BY Davis, Macauley, May, Pudsey, & Smith
ATTORNEYS

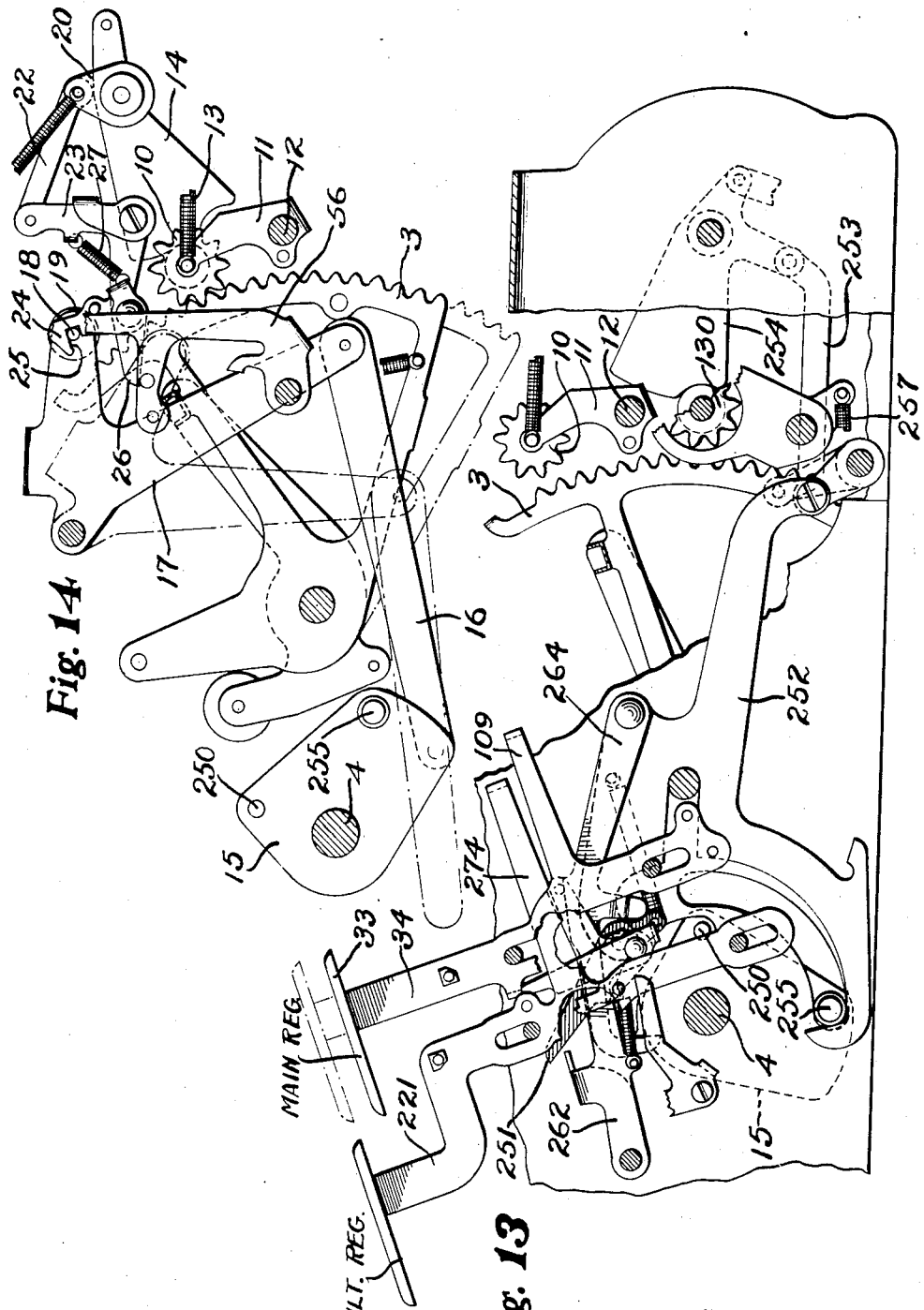

July 11, 1939.  T. M. BUTLER  2,165,340

CALCULATING MACHINE

Filed Oct. 12, 1935  21 Sheets-Sheet 9

INVENTOR
Thomas M. Butler
BY
ATTORNEYS

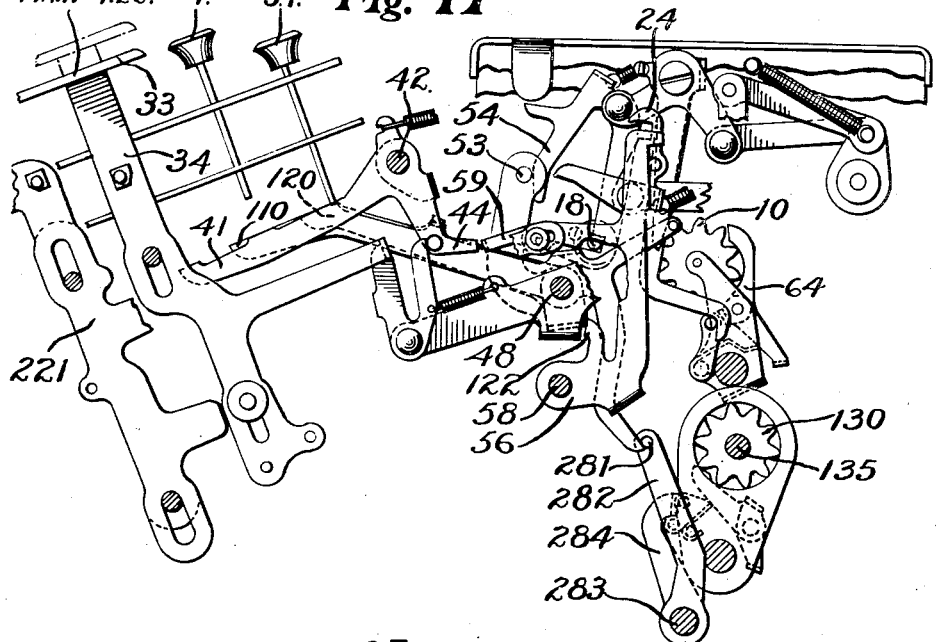
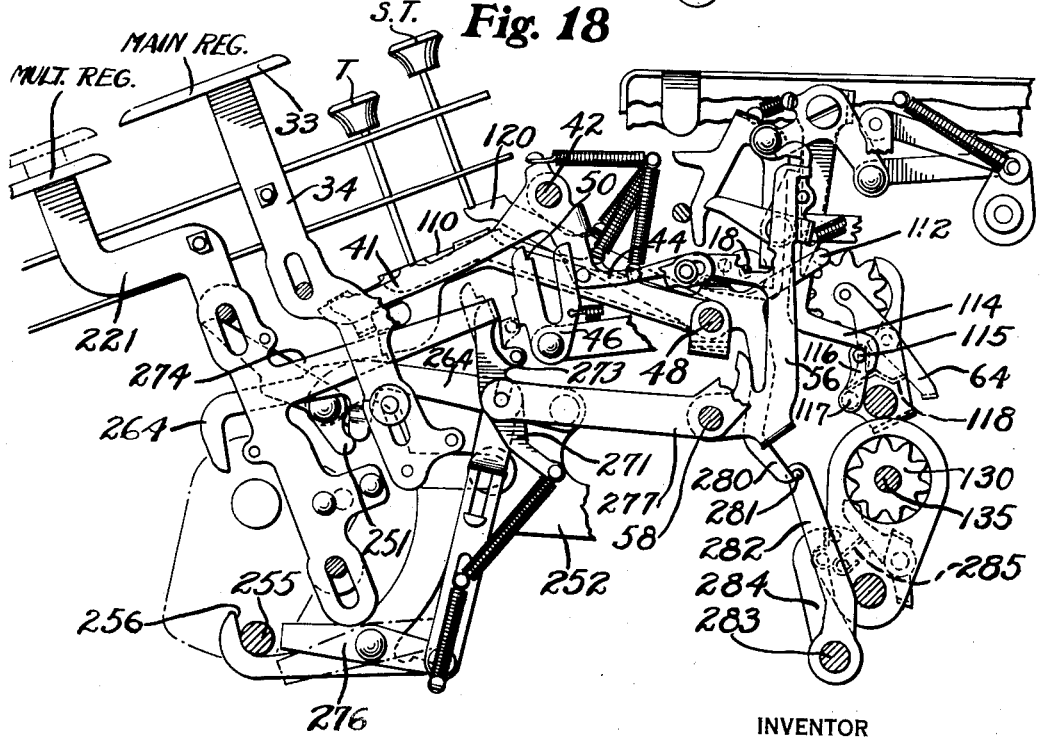

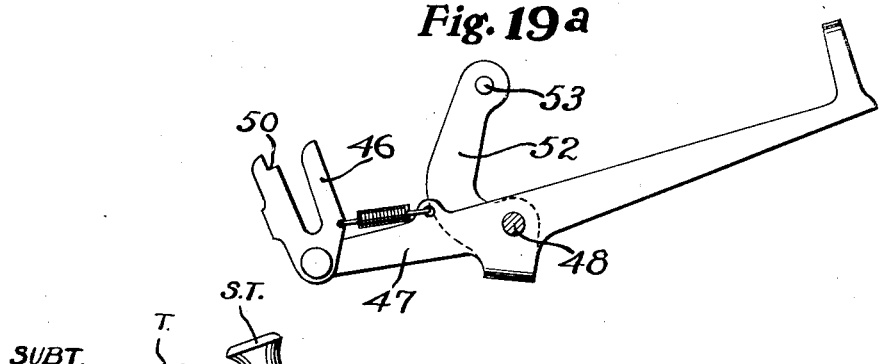
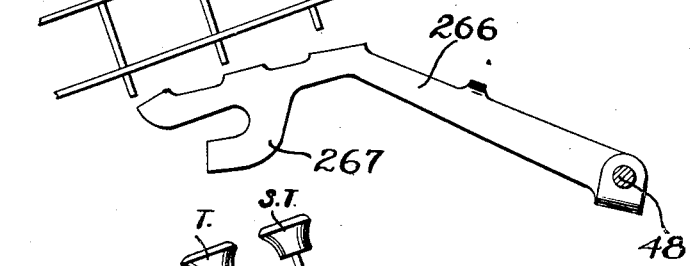
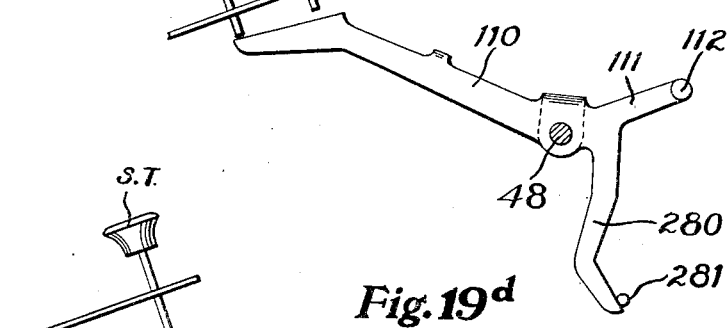
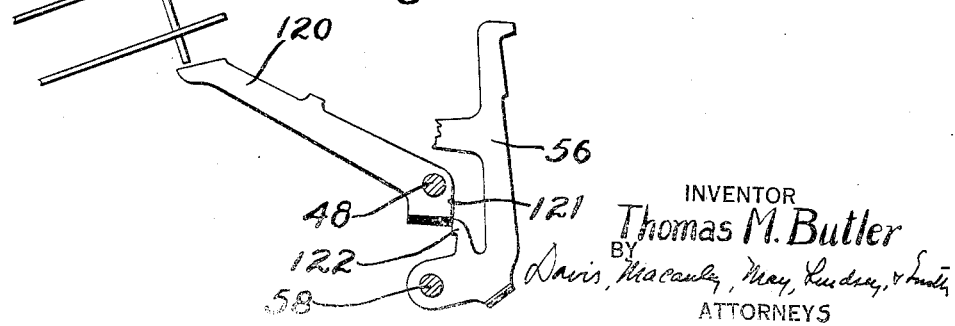

July 11, 1939.  T. M. BUTLER  2,165,340
CALCULATING MACHINE
Filed Oct. 12, 1935  21 Sheets-Sheet 14

INVENTOR
Thomas M. Butler
BY
Davis, Macauley, May, Lindsey, & Smith
ATTORNEYS

July 11, 1939.  T. M. BUTLER  2,165,340
CALCULATING MACHINE
Filed Oct. 12, 1935   21 Sheets-Sheet 15

INVENTOR
Thomas M. Butler

INVENTOR
Thomas M. Butler

July 11, 1939.　　T. M. BUTLER　　2,165,340
CALCULATING MACHINE
Filed Oct. 12, 1935　　21 Sheets-Sheet 17

INVENTOR
Thomas M. Butler
BY
Davis, Macauley, May, Ludien, & Smith
ATTORNEYS

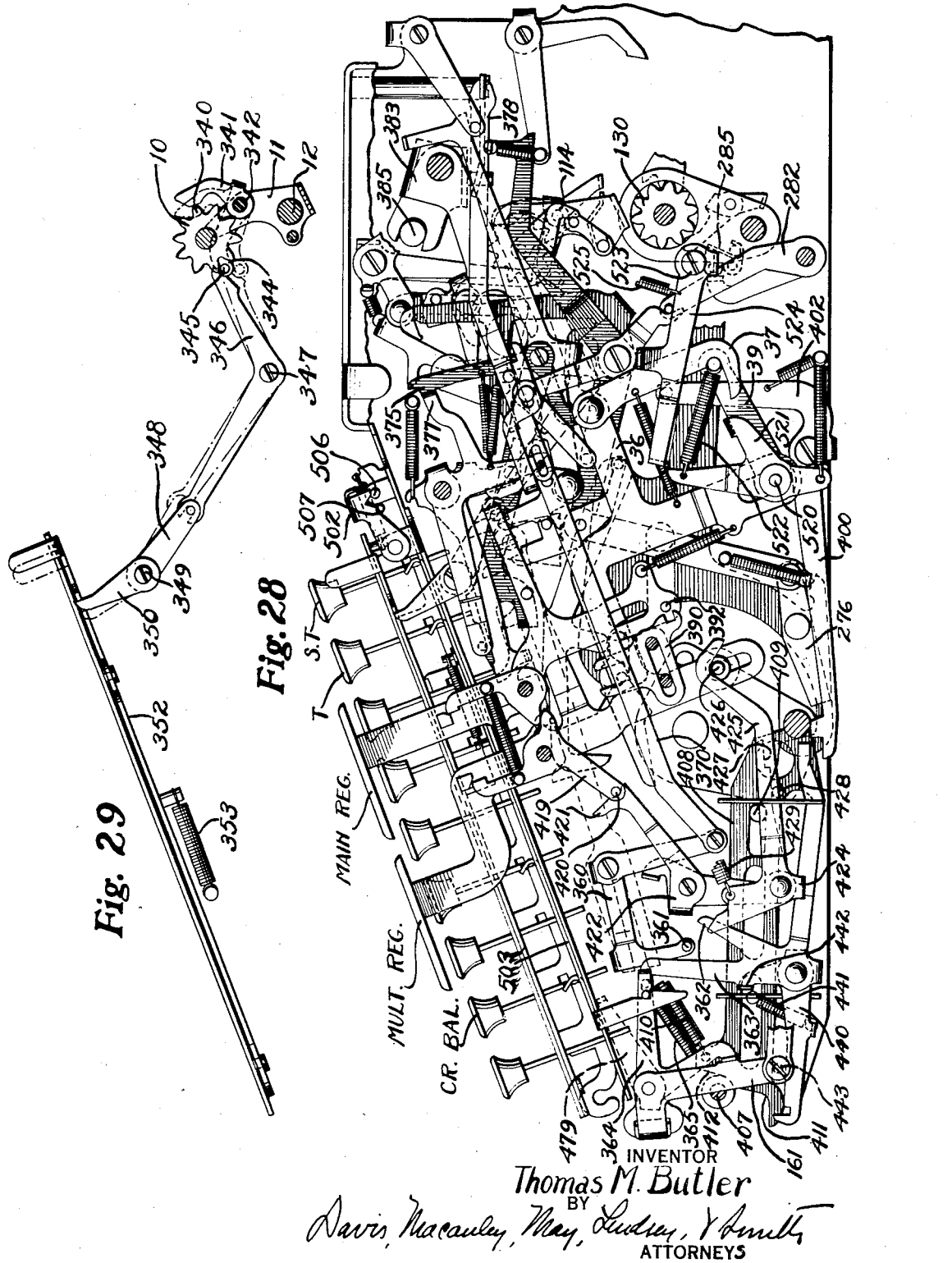

July 11, 1939.   T. M. BUTLER   2,165,340
CALCULATING MACHINE
Filed Oct. 12, 1935   21 Sheets-Sheet 19
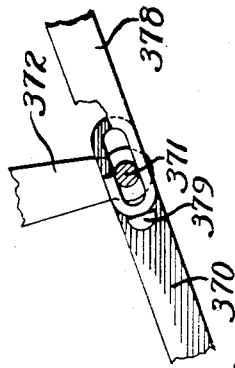
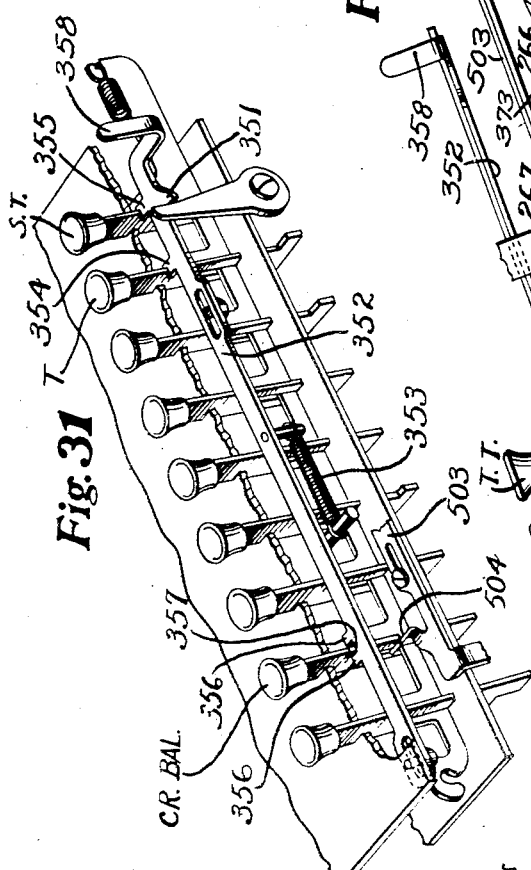
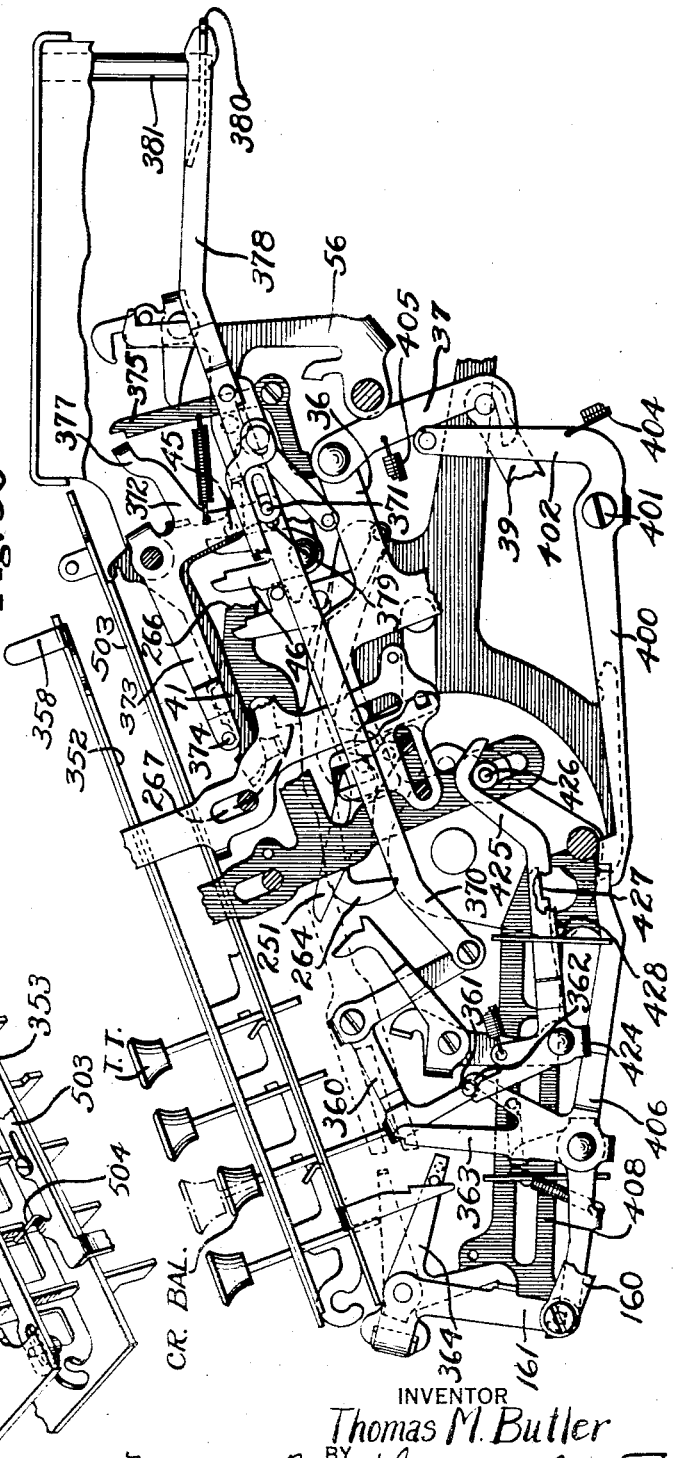
INVENTOR
*Thomas M. Butler*
BY
*Davis, Macauley, May, Lindsey, & Smith*
ATTORNEYS July 11, 1939.　　　　T. M. BUTLER　　　　2,165,340
CALCULATING MACHINE
Filed Oct. 12, 1935　　　21 Sheets—Sheet 20
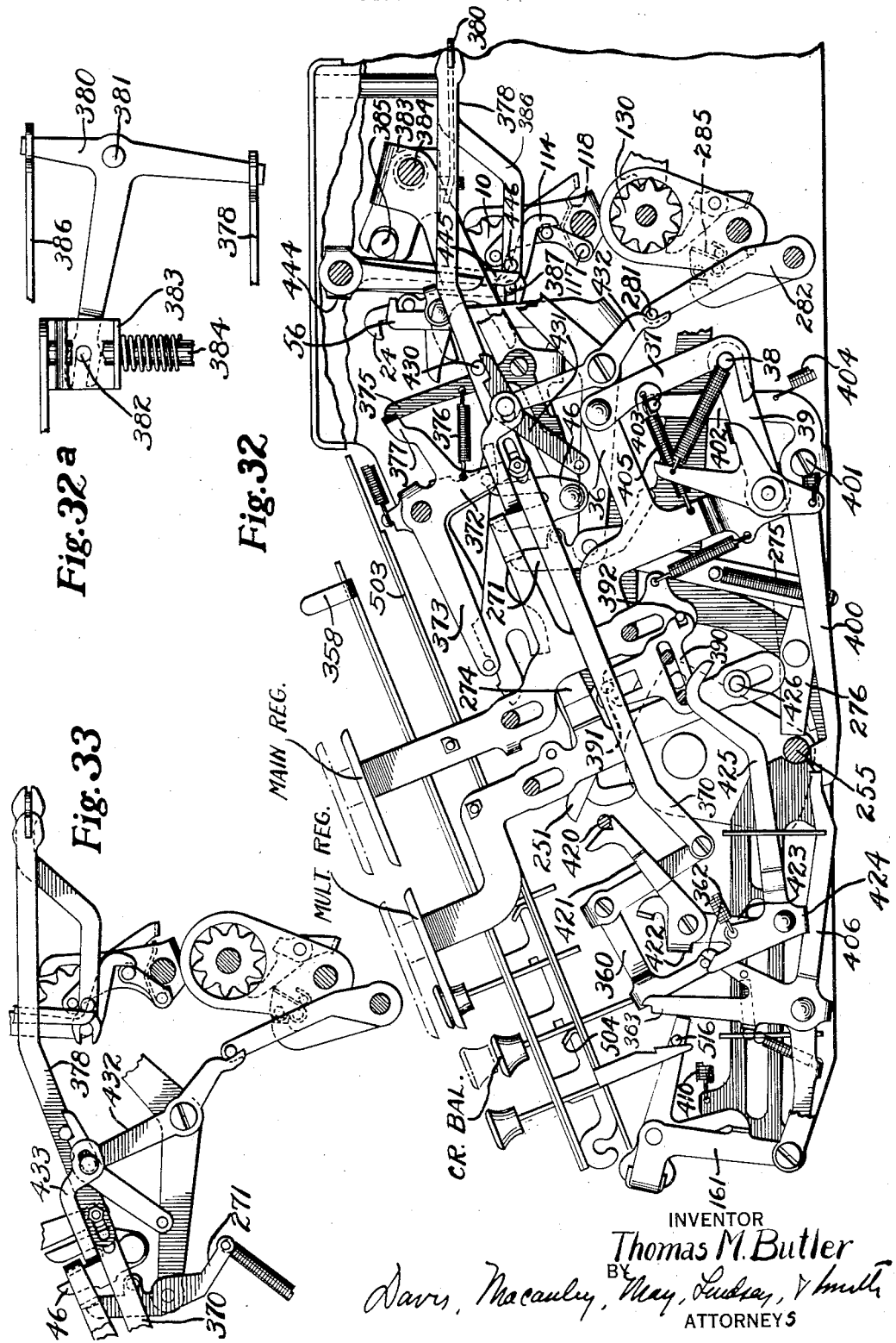
INVENTOR
*Thomas M. Butler*
BY
*Davis, Macauley, May, Lindsay, & Smith*
ATTORNEYS

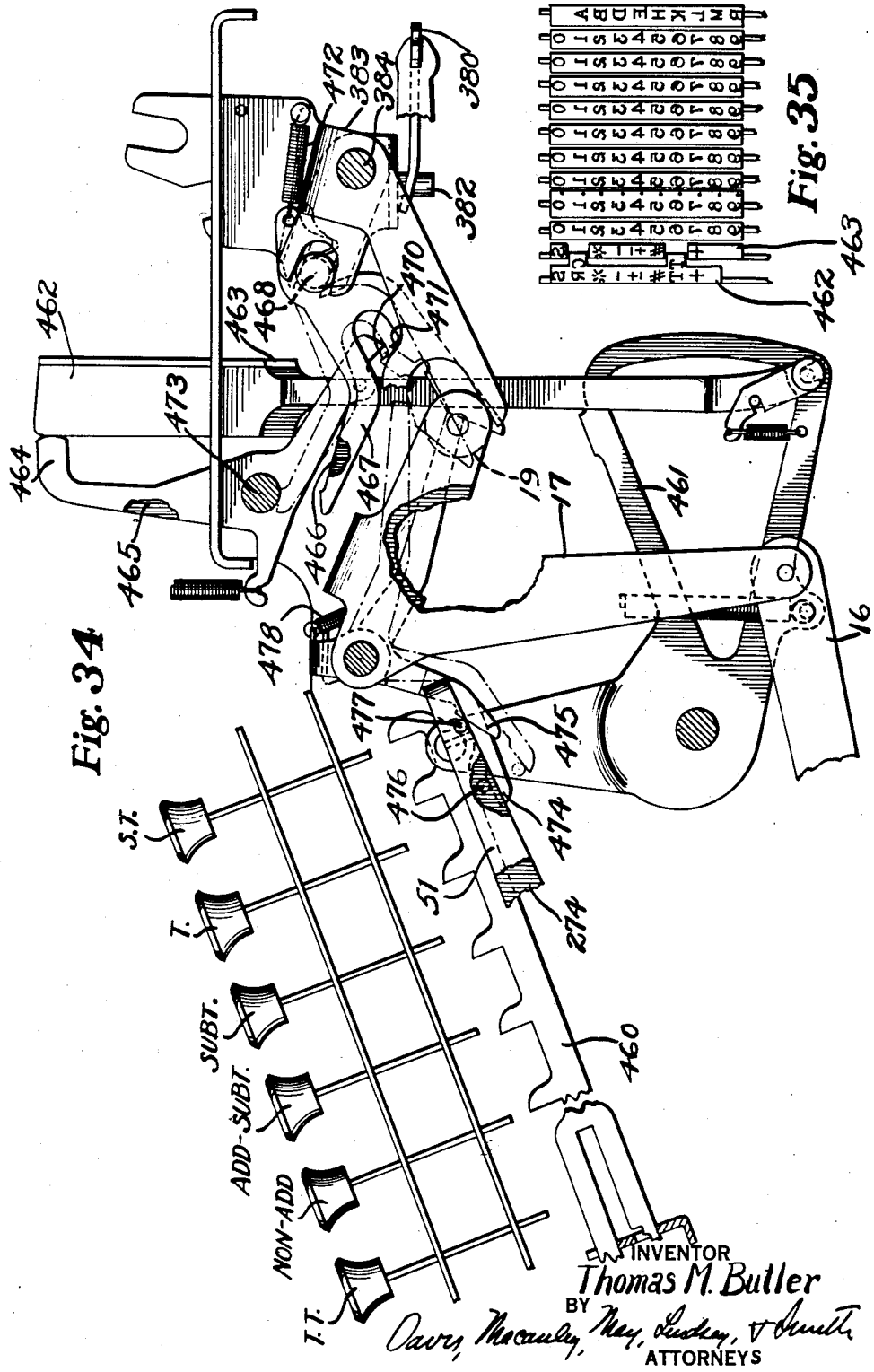

Patented July 11, 1939

2,165,340

UNITED STATES PATENT OFFICE 2,165,340

CALCULATING MACHINE

Thomas M. Butler, Detroit, Mich., assignor to Burroughs Adding Machine Company, Detroit, Mich., a corporation of Michigan Application October 12, 1935, Serial No. 44,751

20 Claims. (Cl. 235—60)

This invention relates to a calculating machine. It is directed particularly to a multiple register machine and it is shown in connection with a machine in which the multiple registers are carried by a rotatable support in the form of a magazine.

The general object of the invention is to provide an improved multiple register calculating machine.

Other objects are; to provide an improved register selecting means; to provide an improved negative total mechanism; to provide an improved tens-transfer mechanism; and to provide an improved total-transfer mechanism.

Other and more particular objects of the invention will appear from the following specifications and drawings.

An embodiment of the invention is shown in the accompanying drawings in which:

Figure 1 is a right side elevation of a machine with the invention applied thereto, some of the parts being omitted for the sake of clearness and those that are illustrated being shown in normal position;

Fig. 2 is a detail left side elevation of a portion of the register selecting mechanism with the parts shown in the positions they occupy when one of the register selection keys is depressed;

Fig. 3 is a detail view of a portion of the register selecting mechanism with the parts in the position they occupy when a register selection key is partially depressed;

Fig. 4 is a view similar to Fig. 3 showing the parts in the position they occupy just before a full depression of one of the register selection keys;

Fig. 9 is a partial right side elevation of the machine showing particularly the mechanism for controlling the engagement and disengagement of the registers and actuator racks, the parts being shown in normal position;

Fig. 10 is a detail elevation and section showing the motor bars and some of the register controls governed by said bars, the view showing one of the bars depressed;

Fig. 11 is a detail side elevation and section showing the controlling mechanism for engaging and disengaging the multiple registers with the actuator racks, the parts being shown in the position they occupy when one of the registers has engaged the racks at the beginning of a return stroke of the machine;

Fig. 12 is a detail view showing certain of the controls governed by the motor bars, the parts being shown in normal position;

Fig. 13 is a detail right side elevation showing the main register motor bar depressed, the parts being shown in the position they occupy before the motor has operated the machine;

Fig. 14 is a detail right side elevation and section showing the main register meshed with the actuator racks at the beginning of a return stroke of the machine;

Fig. 17 is a detail right side elevation and section showing the subtotal key and the main register motor bar depressed, the parts being shown in the positions they occupy before the machine is operated;

Fig. 18 is a view similar to Fig. 17 showing the total key and the multiple register motor bar depressed, the parts being in the positions they occupy before the machine has operated;

Figure 19:
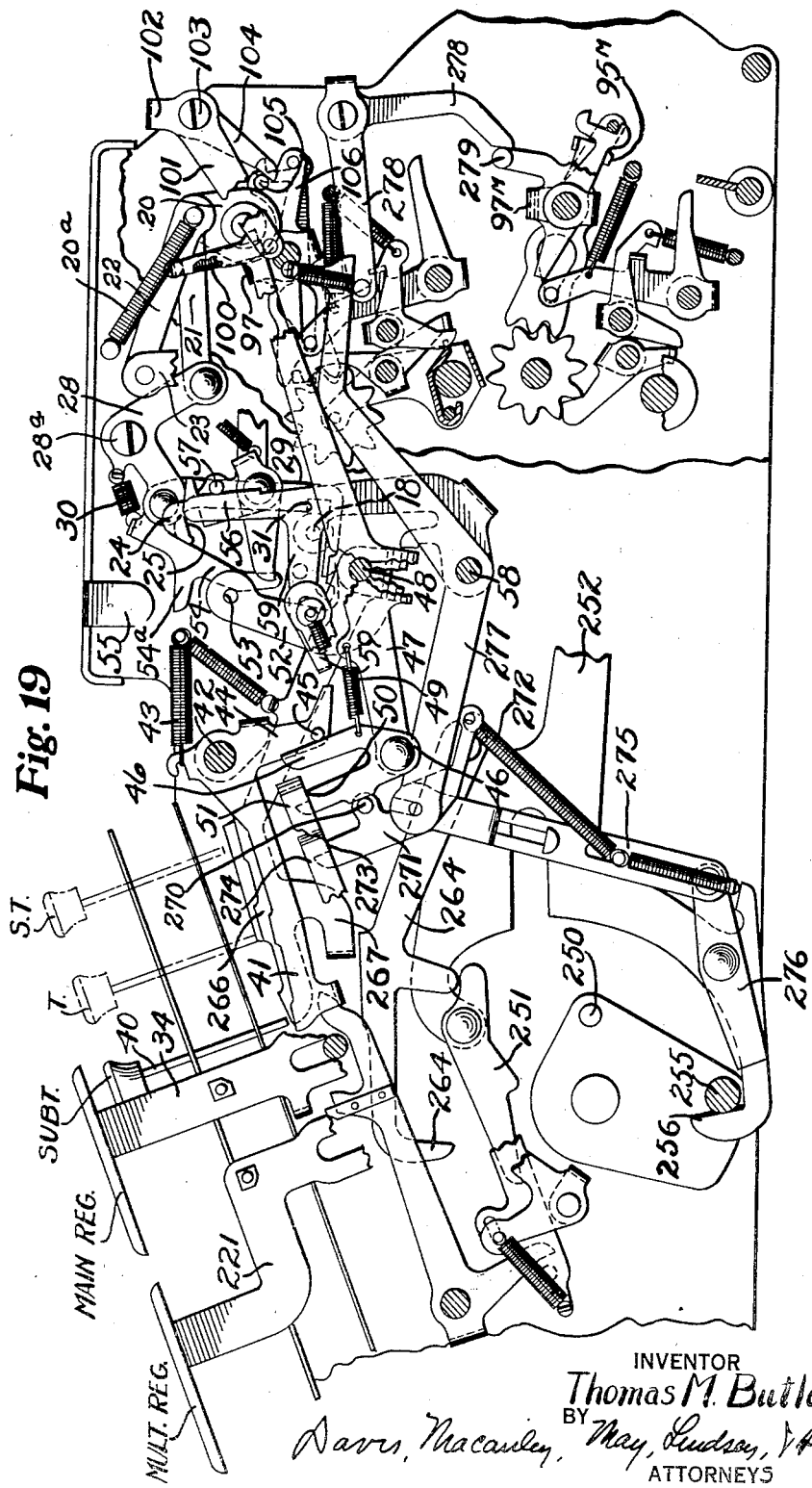
Fig. 19 is a partial right side elevation and section showing the "subtract" key and the controls associated therewith, the parts being shown in normal position without either of the motor bars being depressed.
Figure 20:
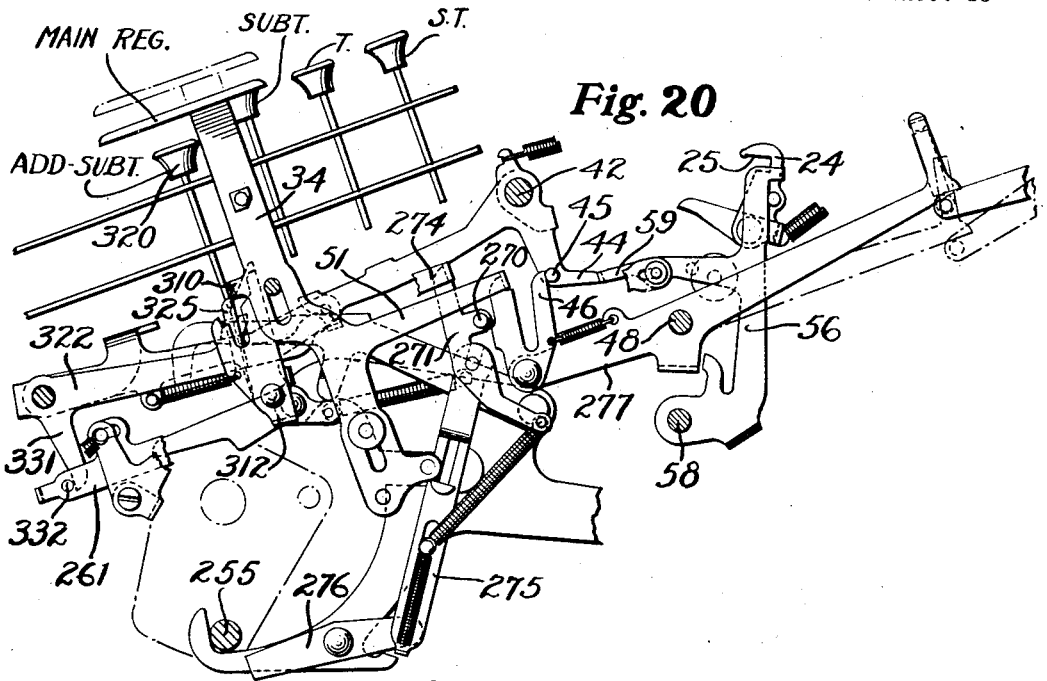
Figure 21:
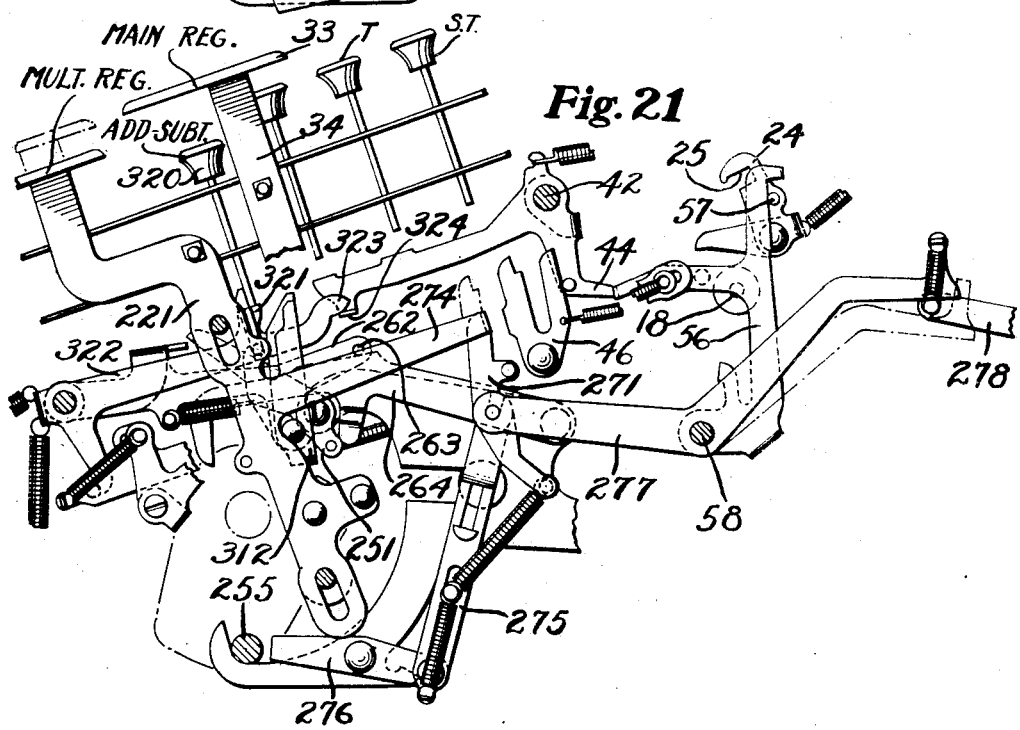

Figs. 19ª to 19ᵈ, inclusive, are separate detail views of certain levers that are nested together in Fig. 19;

Fig. 20 is a detail right side elevation and section showing the parts in the position they occupy with the "add-subtract" key and the main register motor bar depressed;

Fig. 21 is a view similar to Fig. 20 with the

Figure 22:
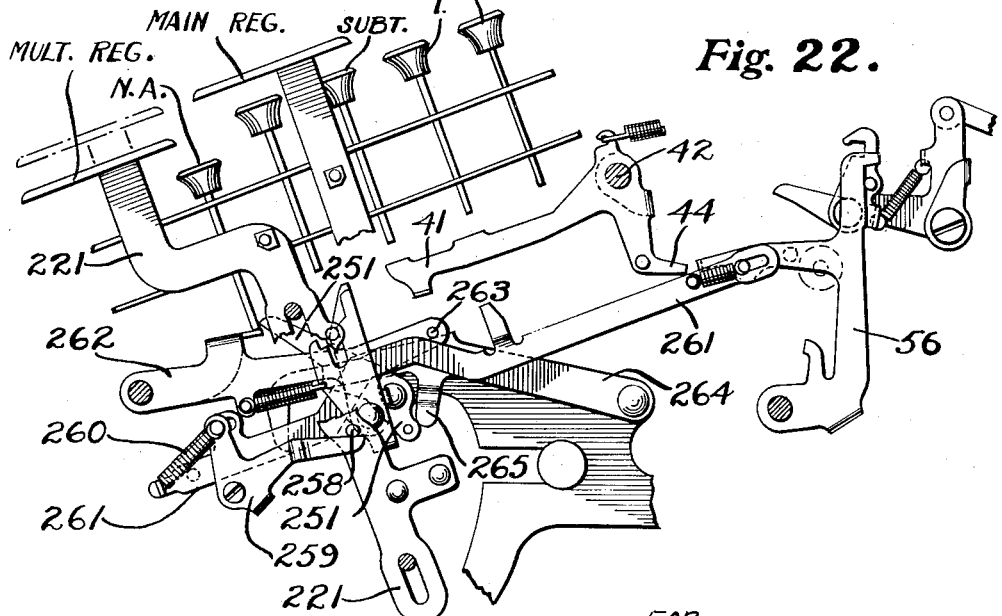
Figure 23:
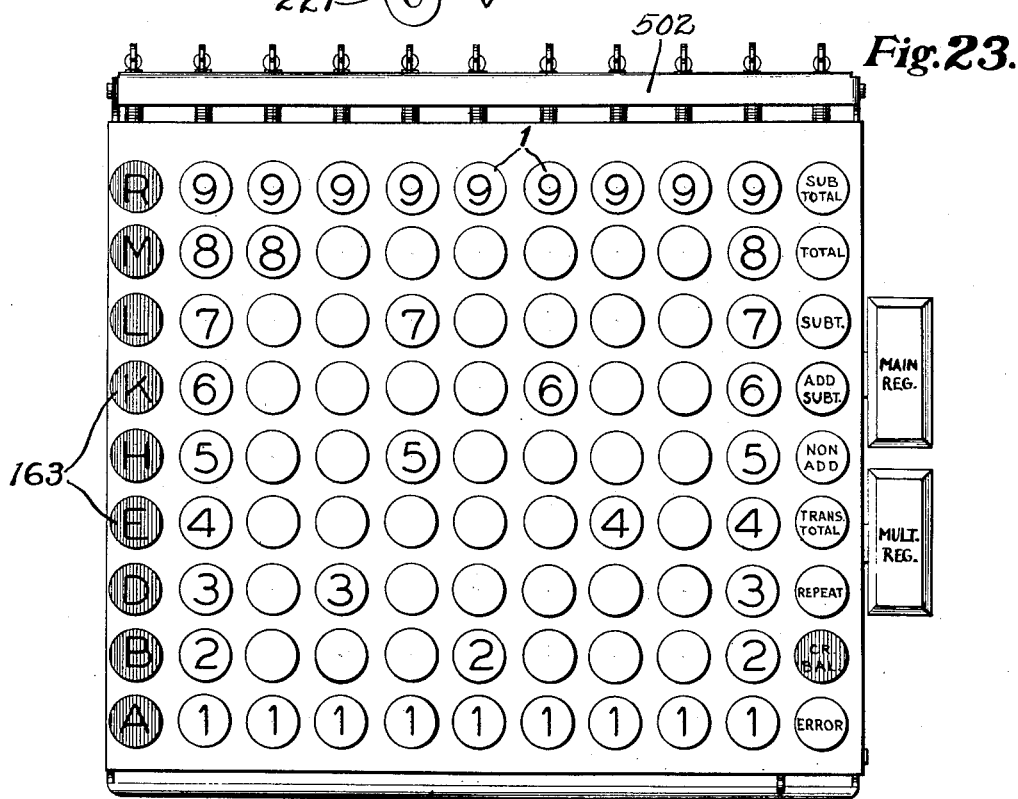
Figure 24:
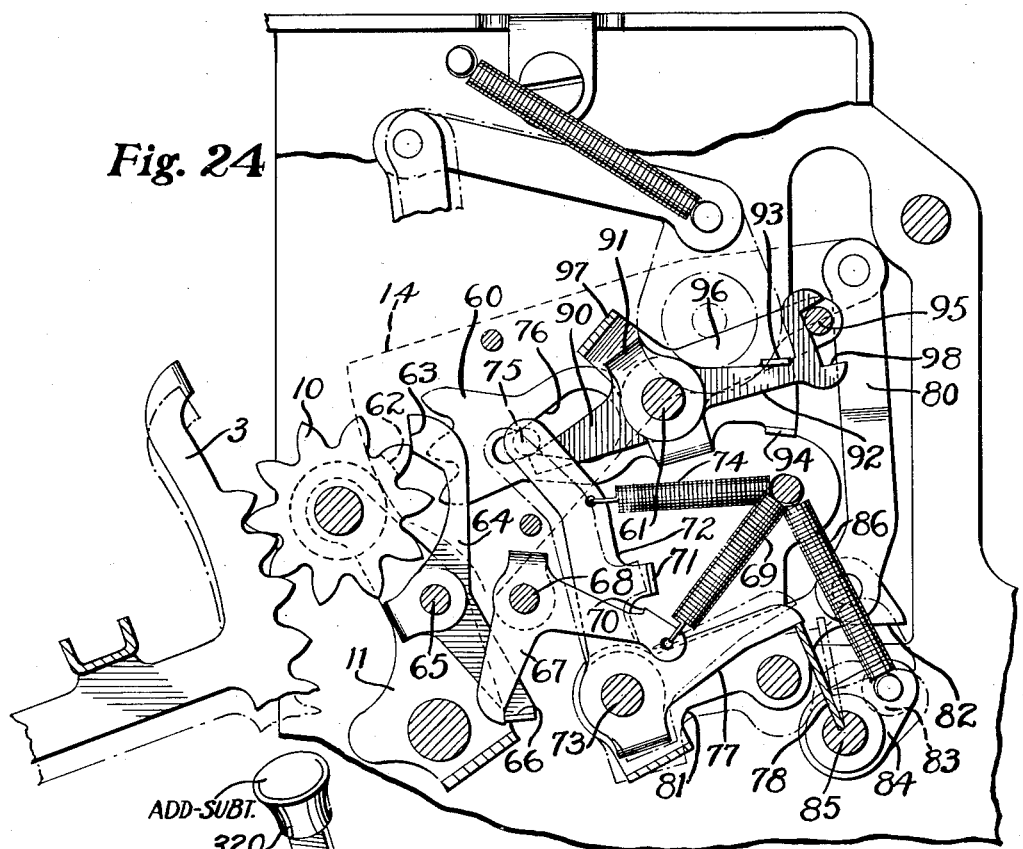
Figure 25:
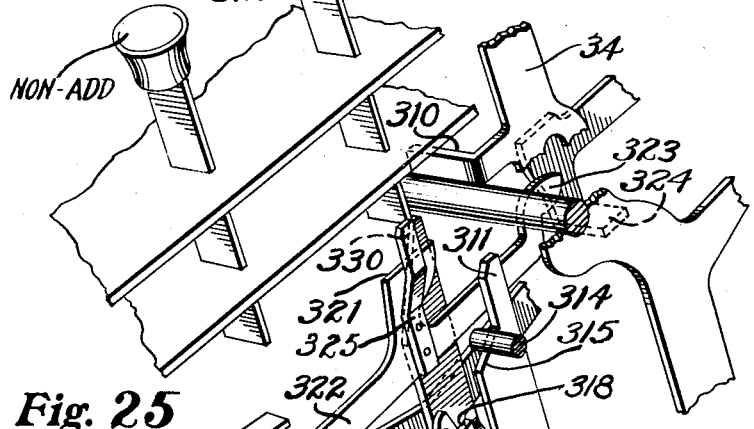
Figure 26:
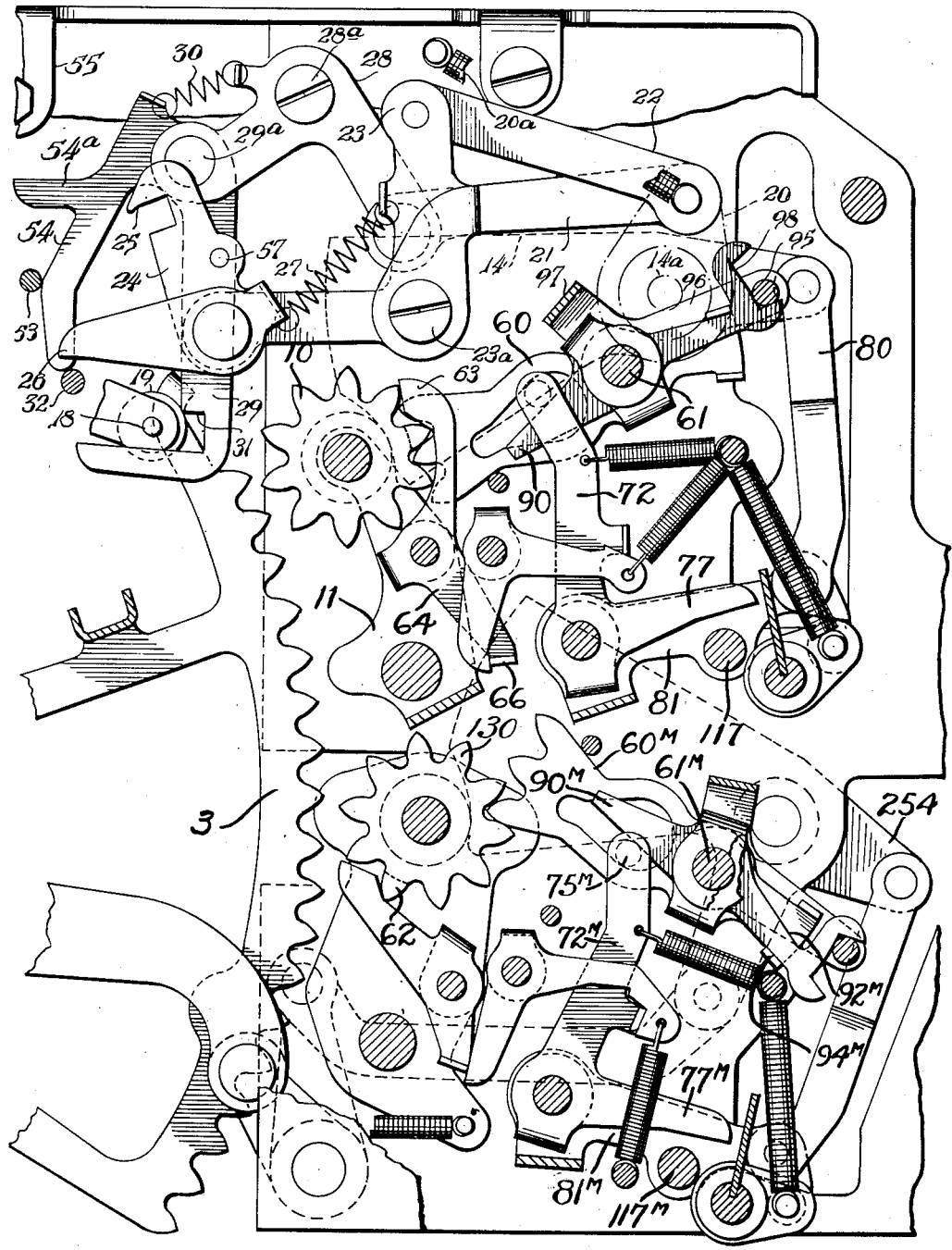
Figure 27:
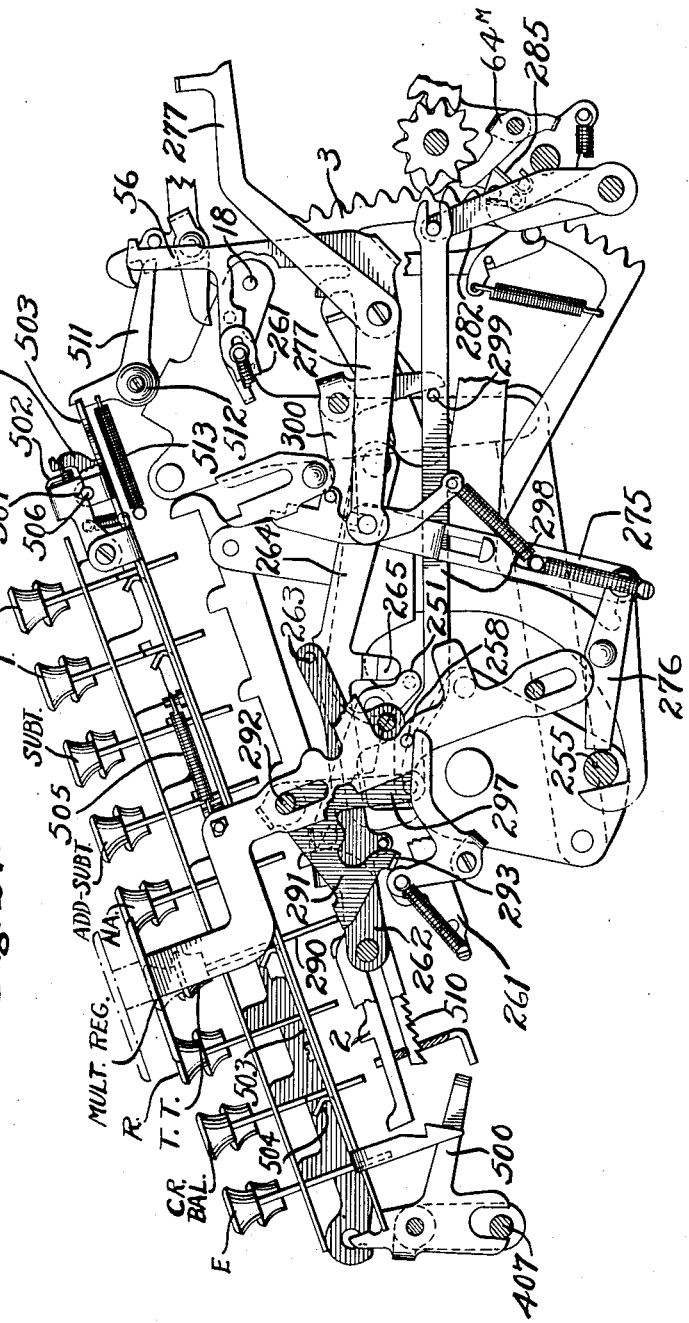

"add-subtract" key and the multiple register motor bar depressed;

Fig. 22 is a detail right side elevation and section showing the non-add key and the associated controls, the parts being shown in the position they occupy with the non-add key and the multiple register motor bar depressed;

Fig. 23 is a plan view of the keyboard;

Fig. 24 is a detail right side elevation and section of the tens-transfer mechanism with the parts in the positions they occupy after an "initial transfer" has taken place;

Fig. 25 is a detail perspective view of the "add-subtract" control mechanism, the parts being in normal position;

Fig. 26 is a detail right side elevation and section showing the tens-transfer mechanism for both the main register and the multiple registers, the parts being in the positions they occupy after a "full transfer" has taken place;

Fig. 27 is a detail right side elevation and section showing the "transfer-total" key and the controls associated therewith, the parts being shown in the positions they occupy with the "transfer-total" key and the multiple register motor bar depressed;

Fig. 28 is a partial right side elevation and section showing particularly the negative total mechanism, the parts being in normal position;

Fig. 29 is a detail view of a portion of the negative total locking mechanism;

Fig. 30 is a detail right side elevation and section showing particularly the negative total mechanism, the parts being shown in the position they occupy with the "negative total" or "credit balance" key depressed;

Fig. 30a is a detail view of the connection of certain links shown in Fig. 30;

Fig. 31 is a perspective view of a portion of the keyboard showing particularly the negative total lock;

Fig. 32 is a partial right side elevation similar to Fig. 30 but with the parts in the position they occupy when the negative total, or credit balance, key is depressed and with both the multiple register and the main register motor bars depressed;

Fig. 32a is a detail plan view of certain parts shown in Fig. 32;

Fig. 33 is a detail view of a portion of the register controlling mechanism used in connection with the negative total operation;

Fig. 34 is a detail right side elevation and section showing portions of the special character printing mechanism and the line spacing mechanism; and Fig. 35 is a detail view of the faces of the type bars shown in Fig. 34.

The invention is shown applied to a calculating machine of the type known as the Burroughs Portable. This machine will be described only very briefly, reference being made to Horton Patent 1,853,050 for details. It is to be understood that the invention may be used with other types of machines.

General machine construction

The machine is provided with a plurality of banks of depressible amount keys 1 (Figs. 1 and 23) which differentially position index, or stop, bars 2 connected to actuator racks 3. A bank of control keys is provided along the right hand side of the keyboard (Fig. 23) whose functions and operation will be described later.

The machine is given a cycle of operation by first rocking a main drive shaft 4 counterclockwise from the position of Figure 1 and then returning it clockwise. These two movements are often called the forward and the return stroke of the machine. The drive shaft may be oscillated by means of a hand crank or by a motor, a portion of the motor being shown at 5 in Fig. 1. When a hand crank is used, it is connected directly to shaft 4.

A printing mechanism is provided including the type bars 6 and the hammers 7. During the forward stroke of the machine, the index bars 2 move forward to differential positions determined by the depressed amount keys and this differentially positions the actuator racks. The racks differentially position the type bars 6 (Fig. 1) and the hammers 7 are operated near the end of the forward stroke.

The paper on which impressions are made is carried by a platen P supported on a carrier 8 which, in the machine shown, is stationary. In many of the machines on the market the carrier is in the form of a traveling paper carriage.

One, or two, registers are provided in the machine of said Horton patent but, in the present machine, provision is made for a larger number of registers without increasing the size of the machine and this is one of the objects and advantages of the invention.

Addition is performed by rocking a register into engagement with the actuator racks after they have been differentially positioned. The racks are then returned to normal during the return stroke of the machine which causes the item indexed on the keys to be entered in the register.

The machine is normally conditioned for addition but may be conditioned for subtraction by means of a subtract lever or, as in this case, by means of a subtract key "Subt." (Fig. 23). Subtraction is performed by rocking a register into engagement with the actuator racks before they are moved to differential positions and by rocking the register out of engagement with the racks after said actuators have been moved to differential positions. This results in rotating the register pinions in the opposite direction to which they are rotated for addition.

Totals and subtotals may be taken, the machine may be non-added, errors may be corrected and various other controls are provided, all as described in said Horton patent and other improvement patents on said Burroughs portable machine. These mechanisms will not be described in detail except as may be necessary to understand the present invention.

The machine is provided with an automatic disconnection feature which acts to disconnect the operating mechanism of the machine from the drive shaft when an attempt is made to operate the machine when it has not been properly conditioned for operation. This is described in detail in said Horton patent.

Main register

The register used for general calculating purposes, which is sometimes called a "crossfooter", will be called the "main" register in order to distinguish it from the multiple registers hereinafter described.

The main register comprises a plurality of register pinions 10 rotatably mounted on a shaft carried by a register frame 11 (Fig. 14) rockable about a shaft 12. The register frame is urged out of engagement with the racks by a spring 13 (Fig. 14) but it may be rocked into engagement by means of a cam 14 pivoted at 14ª. The cam 14 is rocked by power derived from the main drive shaft of the machine. Referring to Fig. 14, the drive shaft 4 has a main drive plate 15 fixed to it. Connected to this plate is a link 16 whose other end is connected to one arm 17 of a pivoted bell-crank yoke whose other arm carries a stud 18 and a cam roller 19. This bell crank yoke operates the dash pot assembly of the machine and the roller 19 will be called the dash pot operating roller. During a cycle of machine operation, the stud 18 and roller 19 are first rocked upward from the dot-dash position of Fig. 14 to the full line position and then returned downward to normal.

Referring to Fig. 9, the cam 14 which controls the main register is rocked by means of a crank arm 20 which is fixed to the same shaft as the cam. Connected to the crank arm are two links 21 and 22. The link 22 is connected to one arm of a pivoted bell crank lever 23 pivoted on a stationary stud 23ª (Fig. 26), the other arm of said bell crank carrying a pivoted pawl 24 having a hooked nose as shown in Fig. 10. This pawl also has a notch 25 (Fig. 10) near its nose, and a tail 26. The pawl is urged counterclockwise as viewed in Fig. 9 by a spring 27. The link 21 is connected to one arm of a bell crank lever 28 pivoted at 28ª (Fig. 9) whose other arm carries a long pawl 29 pivoted at 29ª and shown most clearly in Fig. 26. This pawl is in the form of a yoke urged clockwise by a spring 30 and it has a long nose on its lower end and a notch 31 also near its lower end. The pawls 24 and 29 are adapted to engage the stud 18, which is rocked during each machine cycle for the purpose of rocking the main register into and out of engagement with the actuator racks as will presently appear.

The main register controls are normally in addition condition as shown in Fig. 9. As the stud 18 moves upward, it moves along the edge of pawl 24 and, near the end of the upward movement of the stud, the pawl is rocked counterclockwise by its spring so that the notch 25 engages over the stud 18. During the return movement of stud 18, the pawl 24 is moved downwardly which rocks the bell crank 23 counterclockwise and pulls the link 22 forward to rock the register controlling cam 14 counterclockwise to move the register into engagement with the actuator racks. This movement of the register occurs immediately at the beginning of the return stroke of the machine so that the register is rocked into engagement with the racks before they start on their return movement. After the racks have been returned to normal, and near the end of the cycle of machine operation, the register is moved out of engagement with the racks. When the bell crank 23 was rocked counterclockwise, as above explained, and the link 22 pulled forward, the link 21 was also pulled forward. The latter rocked the bell crank 28 clockwise about its pivot 28ª which pulled the pawl 29 upward (Fig. 19). The parts are proportioned so that, near the end of the downward movement of stud 18, said stud engages the long nose of pawl 29 and pulls the pawl downward to rock bell crank 28 counterclockwise to thrust link 21 rearward to move cam 14 to release the register so that it will be pulled out of engagement with the racks by its spring. Also, during the downward movement of stud 18, the tail 26 of pawl 24 (Fig. 9) engages a stud 32 which causes pawl 24 to be rocked clockwise so as to release itself from stud 18 to thereby permit the stud to move pawl 29.

The main register is thus rocked into engagement with the actuator racks after they have been differentially positioned and is moved out of engagement with them after the item has been added in the register.

*Main register motor bar*

A motor bar 33 is provided for controlling operations in the main register and, for purposes of convenience, this will be called the "main register motor bar."

The motor bar 33 has a stem 34 slidably mounted on the side of the machine and adapted to engage a stud 35 (Fig. 16) on a slidable control plate 36. The latter carries a hook 37 (Fig. 32) engaging over a stud 38 on an arm 39 which, when rocked clockwise from the position of Fig. 28 to that of Fig. 32, causes the motor to give the machine a cycle of operation as described in Horton Patent No. 2,004,282. When the motor bar 33 is depressed, the control plate 36 is moved downward and the arm 39 is rocked to cause a cycle of machine operation to occur. This motor bar also conditions certain other parts of the machine as will presently appear.

It is not necessary to have the motor bar condition any of the parts for addition in the main register, since the parts above described are normally in addition condition. The motor bar simply causes the machine to be given a cycle of operation and addition to be performed in the main register. However, the motor bar 33 selects the main register for addition as against one of the multiple registers, as will be later described.

*Subtraction in main register*

An item may be substracted from the main register by entering the item on the amount keys, depressing the subtract key, and depressing the main register motor bar.

Depression of the subtract key conditions the controls for the main register so that the register will be rocked into engagement with the racks prior to their movement, and moved out of engagement after the racks have been differentially positioned. This results in rotating the register pinions in the opposite direction to their rotation for additon.

The stem of the subtract key 40 (Fig. 19) is positioned over one arm 41 of a bell crank lever pivoted on a shaft 42 and urged clockwise by a spring 43. This bell crank lever has another arm 44 carrying a stud 45 positioned to the rear of a U-shaped member 46 pivoted on the end of a lever 47 that is journaled on shaft 48. The U-shaped member 46 is urged clockwise by a spring 49 and it has a shoulder 50 that is adapted to be positioned under a lateral lug on a projection 51 of the stem 34 of the main register motor bar. The lever 47 has an upwardly extending arm 52 carrying a stud 53 engaging the edge of an extension 54 of the subtract pawl 29. When the subtract key is depressed, the bell crank 41—44 is rocked counterclockwise which moves stud 45 rearwardly and allows U-shaped member 46 to swing clockwise to a position where its shoulder is under the lug on motor-bar-extension 51. If the motor bar is then depressed, the lever 47 will be rocked counterclockwise which moves stud 53 away from extension 54 and allows pawl 29 to move to a position to cause notch 31 to engage stud 18.

Accordingly, at the beginning of a subtraction cycle of machine operation, the bell crank 28 is rocked clockwise to pull link 21 forward to rock the register control cam 14 counterclockwise to cause the register to engage the actuator racks. As the stud 18 moves upwardly the pawl 29 is disengaged from it by reason of the fact that a projection 54a on the extension 54 of said pawl (Fig. 26) engages the stationary lug 55 on the machine to cause the pawl to be cammed counterclockwise. Near the end of the forward stroke of the machine, that is, when the stud 18 approaches its upper limit, the stud engages the nose of the pawl 24 (Fig. 9) and rocks the bell crank 23 clockwise to rock the register cam clockwise to permit the register to move out of engagement with the racks. The pawl 29 is disengaged from stud 18 to enable the above movement to take place by means of a projection on extension 54 (Fig. 19) which engages a lug 55 to cam the pawl 29 counterclockwise.

In order to prevent the pawl 24 from acting to rock the register back into engagement with the racks, a lever 56 is provided, which will be called the "non-add" lever. This lever is positioned so that it will engage a stud 57 on pawl 24 (Fig. 19). The lever 56 is one arm of a yoke pivoted on a shaft 58 and it has a forwardly extending arm 59 on it which terminates in an abutment end adapted to be engaged by the end of arm 44 of bell crank 41—44. When the subtract key is depressed, the end of arm 44 engages the end of arm 59 and rocks arm 56 clockwise to cause it to engage stud 57 to move pawl 24 to a position such that, while its nose is still in the path of stud 18, the stud 18 will not engage in the notch in pawl 24.

The main register is thus rocked into engagement with the actuator racks prior to their movement and rocked out of engagement with them after they have been differentially positioned.

The cycle of machine operation for subtraction is caused by depressing the main register motor bar 33. This selects the main register for operation and disables the controls for the multiple registers, as will be later described so that the item will not be subtracted from the multiple registers.

Tens-transfer mechanism for main register

A novel tens-transfer mechanism has been provided for effecting both carries and borrows in the main register.

This mechanism includes a plurality of transfer segments 60 (Figs. 24 and 26) of which there is one for each register pinion. The segments are pivoted on a shaft 61 and are adapted to be engaged by the register pinions when the latter are rocked out of engagement with the actuators, the engaged position being shown in Fig. 26, and the disengaged position in Fig. 24.

Each of the register pinions 10 has a wide tooth 62 adapted to engage the nose 63 of a pawl 64 when the register pinion moves from its "9" to or through its "0" position and vice versa. The pawl 64 is pivoted on a shaft 65 carried by the rockable register frame 11. The lower end of the pawl has a lateral lug 66 normally positioned behind one arm of a bell crank latch lever 67 pivoted on a stationary shaft 68. The latch 67 is urged counterclockwise as viewed in Fig. 24 by a spring 69. The other arm of the bell crank latch 67 has a shoulder 70 normally positioned behind a lug 71 on an arm 72 pivoted on a shaft 73 and urged clockwise as viewed in Fig. 24 by a spring 74. The latched position of the parts is shown in Fig. 19. The upper end of arm 72 carries a stud 75 operating in a slot 76 in one of the transfer segments 60. It is to be understood that a plurality of pawls, arms, and latches are provided and that a given pawl 67 and arm 72 are controlled by a given register pinion and that such arm 72 controls the transfer segment 60 for the register pinion of next higher order.

Assume that the register pinions 10 are in engagement with the actuator racks (Fig. 24) and that the tens-transfer mechanism is in condition to "borrow", that is, effect a tens-transfer in subtraction operations. This is the condition of the mechanism as illustrated in Figs. 24 and 26. If a given register pinion moves from its "0" to or through its "9" position, the wide faced tooth 62 engages the nose of pawl 64 and rocks the pawl clockwise. This rocks the bell crank latch 67 clockwise and releases the arm 72 which is thereupon moved clockwise by its spring 74.

The movement of arm 72 is limited by reason of the fact that it is a part of a yoke having another arm 77 that limits against a cross bar 78 as shown in Fig. 24. The arm 72 moves from the dot-dash position of Fig. 24 to the full line position and causes what is called an "initial" or "partial transfer". The parts remain in this position until the register is rocked out of engagement with the actuator racks.

It will be recalled that the register is rocked out of engagement with the actuators under the control of a cam 14 shown in dotted lines in Fig. 24. This cam is rocked clockwise from its Fig. 24 position to release the register. Connected to this cam is a link 80 whose lower end is connected to a pivoted arm 81. This arm has an abutment end 82 adapted to engage a roller 83 on a crank arm 84 fixed to a shaft 85 that carries the cross bar or bail 78. Arm 84 and shaft 85 are urged counterclockwise by a spring 86. Near the end of a cycle of machine operation, and after the register 10 has been rocked out of engagement with the racks and into engagement with the transfer segments, the abutment 82 engages the roller 83 and rocks the cross bar 78 from its full line to its dot-dash position of Fig. 24. This releases the arm 77 and enables arm 72 to be moved by its spring 74 from its Fig. 24 to its Fig. 26 position. This movement of arm 72 causes stud 75 to move in the slot 76 in segment 60 and move said segment counterclockwise from the Fig. 24 to the Fig. 26 position thereby effecting a "borrow". This is sometimes called the "full transfer".

The description so far given explains how the transfer segments are moved to effect a tens-transfer but does not deal with their direction of movement. It is necessary, however, to move the segments in one direction to effect "carries" in addition and in the other direction to effect "borrows" in subtraction.

One of the difficulties in mechanisms heretofore provided for this purpose is that, when the tens-transfer mechanism is changed from "carry" to "borrow" condition, as by changing the direction of action of a spring or otherwise, it is difficult to avoid a slight movement of the transfer segments and this movement is transmitted to the register pinion meshed with the segment. The result is that the pinions are moved slightly. This is undesirable, particularly where the register is to be moved from one position to another, as into and out of a register magazine. The slight movement of the pinions may interfere with satisfactory operation. Another disadvantage of prior constructions is that, when an "initial carry", or transfer, takes place the position of the transfer segment is slightly changed and, as the register wheels engage the segments, they are moved slightly.

A further difficulty with the prior art tens-transfer mechanisms operating with registers comprising a single group of pinions whose timing is changed for subtraction is that it is necessary to overcome the action of a group of springs in changing the tens-transfer mechanism from addition to subtraction condition, and vice versa. The present tens-transfer mechanism has been developed to overcome all these objections.

Referring to Fig. 24, a directing member 90 is positioned adjacent the slot 76 in the transfer segment 60. This member has a blunt nose and constitutes one arm of a yoke 91 pivoted in shaft 61 and having another arm 92 extending rearwardly. The member 90 can be swung from the position shown in the upper part of Fig. 26 to the position shown in the lower part of said figure where the tens-transfer mechanism for the multiple registers is illustrated. When the member 90 is in the position shown in the upper part of Fig. 26, the stud 75 on arm 72 will, as the arm 72 is moved clockwise from its Fig. 24 to its Fig. 26 position, rock the segment 60 and the member 90 counterclockwise. The segment 60 has an upper lug 93 on its rear end which is engaged by the edge of arm 92 so that the segment and said member 90 move as a unit.

On the other hand, if the directing member 90 is in the position shown in the lower part of Fig. 26, the stud 75 on arm 72 will, when said arm is rocked clockwise, rock the segment 60 clockwise. The segment 60 has a lower lug 94 that is engaged by the edge of the arm 92 so that member 90 and segment 60 move as a unit.

It thus becomes evident that, by changing the position of member 90, the direction of movement of the transfer segment may be changed. This change occurs without putting a tension of any kind on the transfer segment. The result is that, when the tens-transfer mechanism is changed from one condition to the other, there is no tendency for the transfer segments to be moved to cause the register pinions to be thrown out of alignment.

Further, when the lever 72 is changed from the dot-dash to the full-line position of Fig. 24 by an "initial carry", or transfer, the stud 75 moves in a portion of slot 76 that is concentric with the axis of lever 72 so that the transfer segment is not moved, even slightly.

The condition of the tens-transfer mechanism is changed automatically from "carry" to "borrow" and vice versa as an incident to the change of the machine from addition to subtraction condition, and vice versa. The rear end of arm 92 (Fig. 24) has a notch 98 in which is positioned a bail 95. The bail 95 is urged downwardly by gravity which is preferably assisted by a spring (not shown). Said bail is carried by arms that form an integral part of a yoke 97 pivoted on the shaft 61. The left-hand arm of this yoke viewed from the front of the machine is numbered 98 (Fig. 24) and the right-hand arm is numbered 100 in Fig. 19.

Referring to Fig. 19, it will be recalled that the subtract key stem is positioned over one arm 41 of the bell crank lever 41—44 which, when the subtract key is depressed, frees the U-shaped member 46 that is pivoted on the end of lever 47. The rear end of lever 47 is connected by a spring 100 to one arm 101 of a bail 102 pivoted at 103. The other arm 104 of this bail is positioned to engage a stud 105 on an arm 106 which is integral with the yoke 97 that controls the add-subtract condition of the tens-transfer mechanism.

When the main motor bar is depressed, after the subtract key has been depressed, the U-shaped member 46 is moved downward which rocks lever 47 counterclockwise. The latter rocks bail 102 clockwise and the yoke 97 is, in turn, rocked counterclockwise. Counterclockwise movement of yoke 97 moves bail 95 counterclockwise which in turn moves member 90 clockwise and this changes the tens transfer mechanism from carry to borrow condition.

From this it will be clear that depression of the subtract key conditions the mechanism, i. e., controls the position of the U-shaped member 46, and that depression of the main motor bar moves the parts to change the tens transfer mechanism from carry to borrow position.

The tripped transfer segments are restored upon the next movement of the register into engagement with the racks. The cam 14 must be rocked counterclockwise from its Fig. 26 position to effect such movement. When the cam rocks counterclockwise, it pulls link 80 upward which rocks arm 81 counterclockwise. Arm 81 carries a restoring bail 117 (Fig. 26) which engages the tails 77 of arms 72 and restores said arms to normal latched position. Restoration of arms 72 also restores the transfer segments.

*Totals and subtotals from main register*

A total or a subtotal may be taken from the main register by depressing the total or subtotal key, respectively, and by depressing the main register motor bar.

It will be appreciated that, considering the engagement and disengagement of the register with the actuator racks, a total taking operation is similar to a subtract operation, that is, the register is engaged with the racks prior to their movement and disengaged after the racks have moved to differential positions. The difference from a subtract operation is that, in total taking, the racks are positioned under control of the register pinions instead of under the control of the amount keys.

Figure 15:
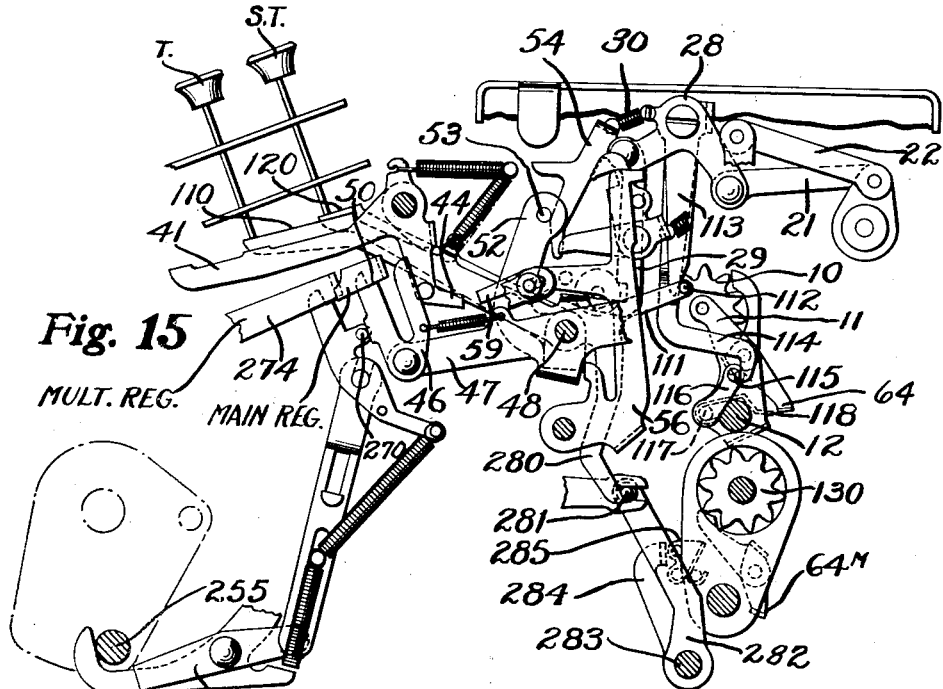
Fig. 15 is a detail right side elevation and section showing the total and subtotal keys and the associated controls, the parts being shown in normal position.

Referring to Fig. 15, a total key T and a subtotal key ST are provided on the keyboard. Positioned under the stem of the total key T is one end of the arm 41 of bell crank 41—44 heretofore described. When either the total or the subtotal key is depressed, the bell crank 41—44 is rocked counterclockwise to free U-shaped member 46 for movement to position where shoulder 50 is under the lug on extension 51 of the main register motor bar stem. When the motor bar is depressed the lever 46 is rocked counterclockwise. This causes the upwardly extending arm 52 of lever 47, with its stud 53, to move away from extension 54 which releases the latch 29 to permit its notch 31 to move over stud 18 (Fig. 19). The result is that, as stud 18 moves upward at the beginning of a machine cycle, the register will be rocked into engagement with the racks at the beginning of the cycle of machine operation.

The rocking of bell crank 41—44 by depression of the total key also causes the end of arm 44 to engage the end of projection 59 on non-add lever 56 which causes the non-add lever to be moved far enough to move latch pawl 24 so that its nose will still be in the path of the stud 18, but the latch will be far enough to the rear so that its notch 25 will not engage over said stud.

Under these conditions the register will be rocked into engagement with the actuator racks at the beginning of a cycle of machine operation, it will be rocked out of engagement with said racks near the end of the forward stroke, and it will remain out of engagement during the return stroke of said cycle.

Positioned under the ends of the total and subtotal key stems is one end of a lever 110 (Fig. 19c) which is pivoted on the shaft 48. This lever has a rear extension 111 carrying a stud 112 positioned behind an arm 113 of a yoke whose other arm 114 has a bent lower end extending behind a stud 115 on an arm 116 fixed to a shaft 117 that carries a total locking bail 118.

When the total key is depressed to the position of Fig. 18, the total locking bail 118 is rocked to the position shown in said figure so that it blocks all of the pawls 64 of the tens-transfer mechanism. The result is that, when the register pinions arrive at their zero positions, the pawls 64 will block the pinions in "0" position. Accordingly, the actuator racks, when moved during a cycle of machine operation with the register in engagement with the racks as above explained, will be differentially positioned in accordance with the amount in the register pinions.

When a subtotal is taken, the operation is the same except that the register is not rocked out of engagement with the actuator racks. The stem of the subtotal key ST is positioned over the arm 41 of bell crank 41—44 and over the end of lever 110 so that, when this key is depressed, the action will be the same as above explained. The subtotal key stem also extends over the end of a lever 120 (Figs. 17 and 19d) pivoted on shaft 48 and provided with an abutment portion 121 (Fig. 19d) adapted to engage the abutment 122 on the non-add lever 56. The parts are proportioned so that, when the sub-total key is depressed as shown in Fig. 17, the non-add lever 56 will be moved rearwardly farther than it is by the bell crank 41—44 which is rocked by the total key to engage the projection 59 on non-add lever 56. This is illustrated in Fig. 17 where the subtotal key is shown depressed and the end of arm 44 is separated from extension 59. The rearward movement of the non-add lever 56 totally disables the latch 24 with the result that, near the end of the forward stroke of the machine, the register will not be rocked out of engagement with the racks, but will remain in engagement with them so that the total taken will be returned to the register during the return stroke of the machine.

Certain interlocks are provided that will be later described.

Multiple registers

In addition to the main register, ten separate registers are provided which will be referred to herein as the "multiple registers" in order to distinguish them from the main register.

Each multiple register comprises a plurality of register pinions 130 rotatably mounted on a sleeve 131 (Fig. 8) having collars on its ends (Fig. 5) for holding the pinions on the sleeve. This makes each register a self-contained unit.

The multiple registers are carried by a rotatable support in the form of a magazine comprising a circular plate 132 (Figs. 7 and 8) fixed to a shaft 133. The rotatable plate 132 supports a plurality of long pins or shafts 134 (Fig. 8) that carry the multiple registers.

In order to perform calculations in the registers, the register magazine is indexed and the indexed register is moved from the magazine to an active position relative to the actuator racks. The mechanisms for accomplishing this will be described in detail later but the operation will be briefly explained here.

Figure 8:
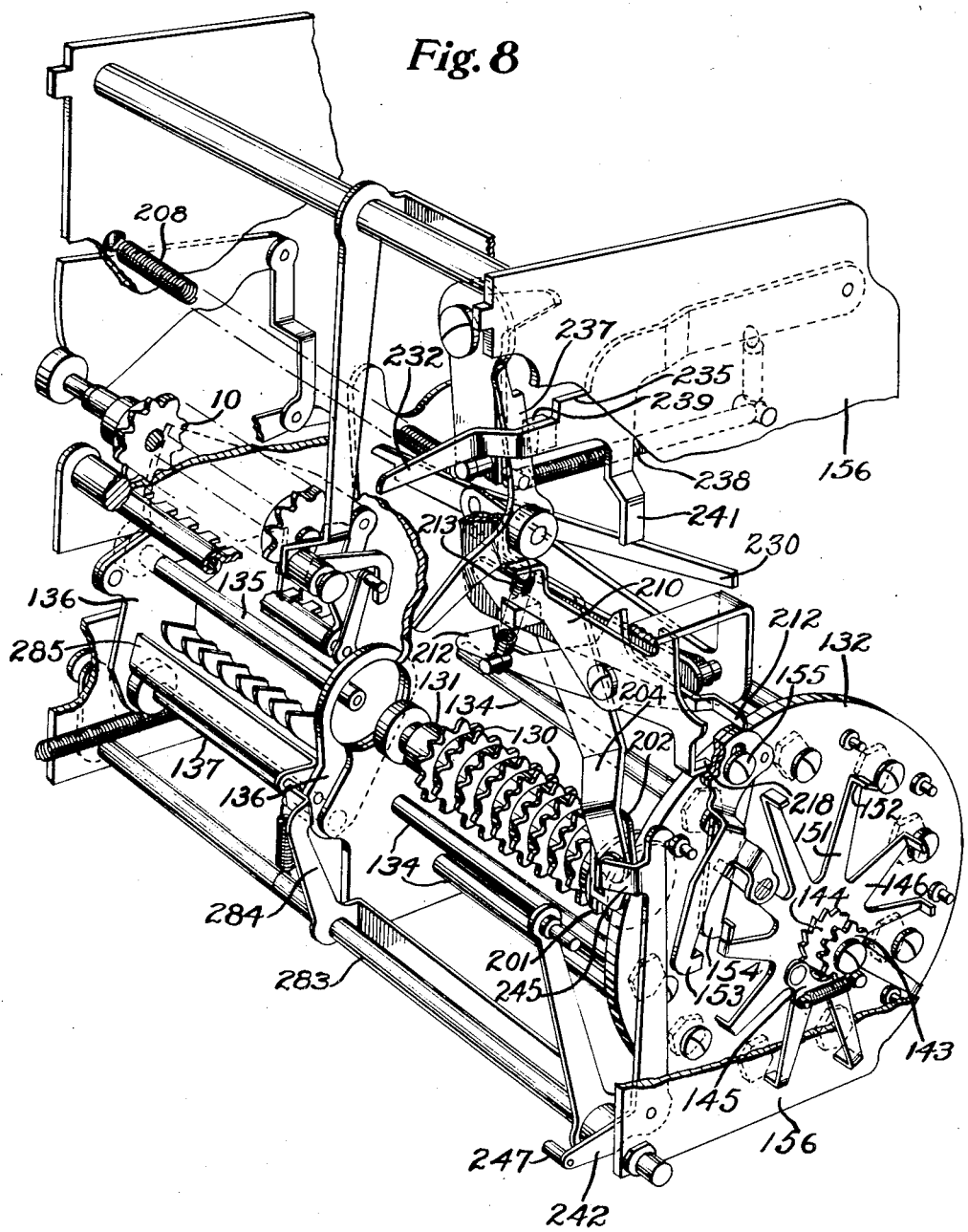
Fig. 8 is a perspective view of certain of the parts to the rear of the section line 5—5 of Fig. 1 showing particularly the means for moving the registers to and from the magazine, the parts being in normal position.

In Fig. 8 a register is shown in indexed position. The register is moved from the position shown to a position on a pin 135 on a rockable register frame having side plates 136 pivoted on shaft 137 (Fig. 9). This positions the register adjacent, or in alignment with, the actuator racks 3, which position will be called its "active" position. The register frame 136 is rocked to engage and disengage the active register with the actuator racks by mechanism that will be presently described.

Multiple register selection

The multiple registers are selected by indexing the magazine and, in the machine shown, this is done under the control of a series of register selection keys on the keyboard.

The magazine is urged to rotate clockwise as viewed in Figure 1 by a spring 140 which acts on a toothed sector 141 pivoted at 142. This sector meshes with a gear 143 fixed to a ratchet 144 that is connected by a pawl 145 to a spider 146 fixed to the magazine shaft 133. The spring 140 is tensioned by power from the main drive shaft 4 of the machine through a link 147 connected to a crank 148 on the drive shaft 4. The rear end of this link has a slot 149 in which a stud 150 on sector 141 is positioned.

With the parts in the position of Fig. 1, the sector 141 is in its extreme clockwise position. The spring 140 is acting on the sector to tend to move it counterclockwise. If the register magazine 132 is released, the sector will move counterclockwise and rotate the magazine clockwise until the magazine is arrested. As the sector 141 moves, the stud 150 moves in the slot 149, that is, the sector and magazine are free to be indexed without interference from the link 147. During each cycle of machine operation the link 147 is first moved rearwardly and then returned forward. If the stud 150 on sector 141 is in any of its forward positions, it will be returned to the Fig. 1 position during the cycle of machine operation and the spring 140 will be retensioned. The power means for moving the register magazine is thus always maintained in condition for action.

Figure 6:
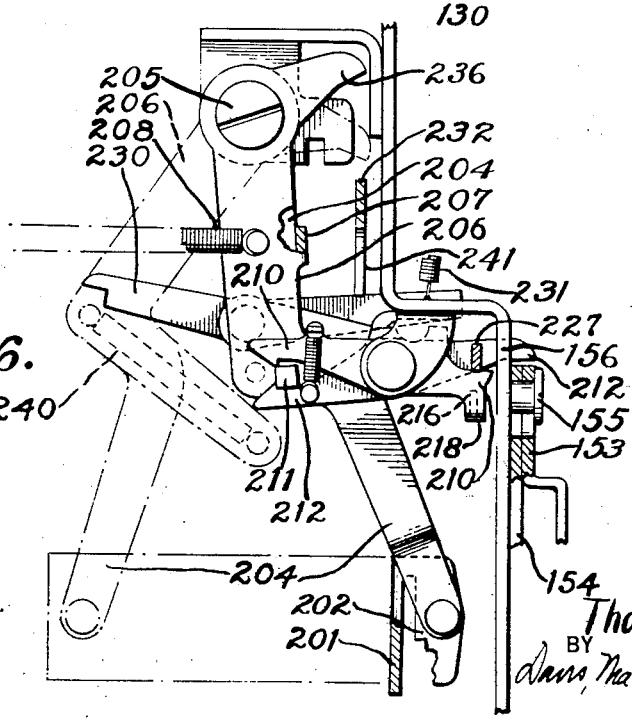
Fig. 6 is a detail view showing a portion of the mechanism for moving the registers to and from the register magazine.

The magazine is arrested in its various indexed positions under the control of the "spider" 146 (Fig. 8) having ten radial arms 151 on it. The spider is fixed to the magazine shaft 133 and thus rotates with it. Five of these arms 151 have lateral lugs 152 on their ends which project outwardly as shown in Fig. 8 and the other five have lugs 153 that project inwardly. The outwardly extending lugs 152 cooperated with a stop arm 153 and the inwardly extending lugs with a stop arm 154 (Fig. 8). These two stop arms are fixed together to act as a stop unit and they are pivotally and slidably mounted on a stud 155 on a stationary plate 156 (Figs. 6 and 8). The position of these stop arms is controlled by means of a link 160 (Fig. 1) which is connected at one end to the stop arms and at its other end to an arm 161 forming part of a bail 162 that extends across the front of the machine (Fig. 23). At its left-hand end, the bail is under the control of a bank of register selection keys 163.

The stems of the register selection keys (Fig. 2) extend into cam notches 164 in a control slide 165. These cam notches are shaped so that depression of one of the keys will move the slide either forward or backward, depending upon which key is depressed and the position of the slide at the time of the depression. The slide has nine positions corresponding to the nine keys.

The forward end of slide plate 165 carries a stud 166 (Figs. 4 and 5) positioned between the ends of two arms 167 and 168 pivoted on shaft 169 and urged toward one another by a spring 170. The lower ends of these arms have lateral lugs on them which abut against an arm 171 integral with yoke 162.

When the slide 165 is moved either forwardly or rearwardly, its stud 166 moves the corresponding arm 167 or 168 and, if both arms were free, they would move the arm 171 to move bail 162. But, during the major portion of the key depression, the arm 171 is latched against movement so that movement of slide 165 merely tensions spring 170 as shown in Fig. 4. The latching and unlatching of arm 171 is accomplished as follows:

Arm 171 has a stud 172 on its lower end with which two notched, bell-crank, latch levers 173 and 174 (Figs. 3 and 4) cooperate. These levers are pivoted at 175 and urged clockwise by springs 176. There are five notches in each lever and the notches in one are offset relative to the other so as to give ten positions for arm 171. Two latches are used to get ten notches within the desired space. One latch would not allow enough metal to remain between notches. The latches 173 and 174 have their upper arms notched to straddle a stud 177 on a lever 178 pivoted on shaft 169. The upper end of lever 178 has a notched end straddling a stud 180 (Fig. 3) on the end of a latch plate 181. Latch plate 181 is a latching slide plate used to latch the keys depressed. It has cam noses 182 (Fig. 3) adapted to pass through openings 183 in the stems of the keys. There is a bridge of metal 184 separating each opening 183 into an upper and lower part.

As one of the keys 163 is depressed the metal bridge 184 engages one of the noses 182 and cams slide 181 rearwardly against the tension of a spring 185 (Fig. 2) that urges it forward. As the slide 181 moves rearward it rocks lever 178 counterclockwise. This frees the latches 173 and 174 to permit them to be rocked clockwise by their springs 176 so that the appropriate notch in one of them will engage the stud 172 to lock the arm 171 against movement. The arm 171 is thus locked quite early in the key depression. As the key continues to move, its bridge 184 engages an edge of a cam notch 164 of the slide 165 and shifts the latter in one direction or the other so that either the arm 167 or 168 (Fig. 2) is moved to tension the spring 170 as shown in Fig. 4. As depression of the key is completed, the metal bridge 184 passes below the nose 182 and the slide 181 is moved forward by spring 185. This rocks lever 178 clockwise which causes latches 173 and 174 to be rocked counterclockwise to released position. Arm 171 is thus freed whereupon the spring 170 acts to move the arm 167 or 168, as the case may be, to move bail 162 to a new indexed position corresponding to the key depressed. The movement of bail 162 is transmitted by link 160 (Fig. 1) to stop arms 153, 154 (Fig. 8). As soon as these arms are moved, lug 152 of the spider 146 which was previously engaged by one of these arms 153 or 154, is released and the spring 140, acting on sector 141, rotates the register magazine clockwise until it is arrested by the engagement of one of the lugs 152 on arms 151 with the stop arm 153 or 154, as the case may be, that has been indexed. As the arm 171 and, therefore, the arms 153 and 154 are latched while the plate 165 is being shifted by a key depression, which may be either slow or rapid, and are released only after the slide 165 has received its new setting, whereupon the spring 170 rapidly moves the arm 171 to a corresponding position, the movement of the arms 153 and 154 to their new positions is completed rapidly enough after releasing the last engaged lug 152 to arrest the spider 146 and the register magazine in the selected register position even if that is the register position immediately following the previously selected register position.

It is not desired to have the register selection keys free for depression while the magazine is being indexed and a lock has been provided to insure that this will not happen.

The rear end of latching slide 181 (Fig. 2) has a lateral lug 190 on it with which the notched edge of a pivoted arm 191 is adapted to engage. The end of this arm is connected by a link 192 to the end of another arm 193 fixed to a shaft 194. This shaft extends across the machine and, on its right-hand end (Fig. 1), it has a lever 195 fixed to it. This lever carries a stud 196 over which is positioned an abutment 197 fixed to link 160. It will be recalled that link 160 is connected to stop arms 153 and 154 which are slidable for a limited distance and which are urged downward as will later appear. As long as the register magazine is in an indexed position with one of the lugs 152 engaged with one of the stop arms 153 or 154, the urge of spring 140 tending to rotate the magazine, will hold the stop arms upward. The abutment 197 on link 160 is thus held upward. But, when a register selection key is depressed, and when the link 160 is moved to index the stop arms 153, 154, the upward pressure on arms 153, 154 is relieved whereupon they move downward. This moves abutment 197 into engagement with stud 196 and rocks lever 195 counterclockwise. This rocks shaft 194, raises link 192, and locks plate 181 until the register reaches a new indexed position. As this happens, one of the lugs 152 strikes its stop arm 153 or 154 and moves these arms upward. This raises link 160 and abutment 197 whereupon the link 192 moves downward to release the slide 181. Accordingly, while the register magazine is moving, the position of the indexing slide plate 165 cannot be changed.

Certain other interlocks are provided as will presently appear.

An important advantage of this indexing mechanism is that the register support or magazine always moves in the same direction as contrasted with constructions where the magazine must be returned to positions that have been passed. The magazine may be indexed from any position to any other position by a movement of the magazine in the same direction. The control of this movement is, in the embodiment shown, by means of keys. Upon depression of any of the nine selection keys the register magazine immediately moves to its new indexed position. The operator need do nothing but depress the key corresponding to the register desired.

Another feature of the register selection is that, when one register selection key has been depressed, it will remain depressed and the register corresponding to it will be in active position no matter how many times the machine is operated. To put it another way, the register selection keys are not released at the end of each machine operation as is the case with other keys. This will be described in detail later.

*Transferring multiple registers to and from magazine*

Figure 5:
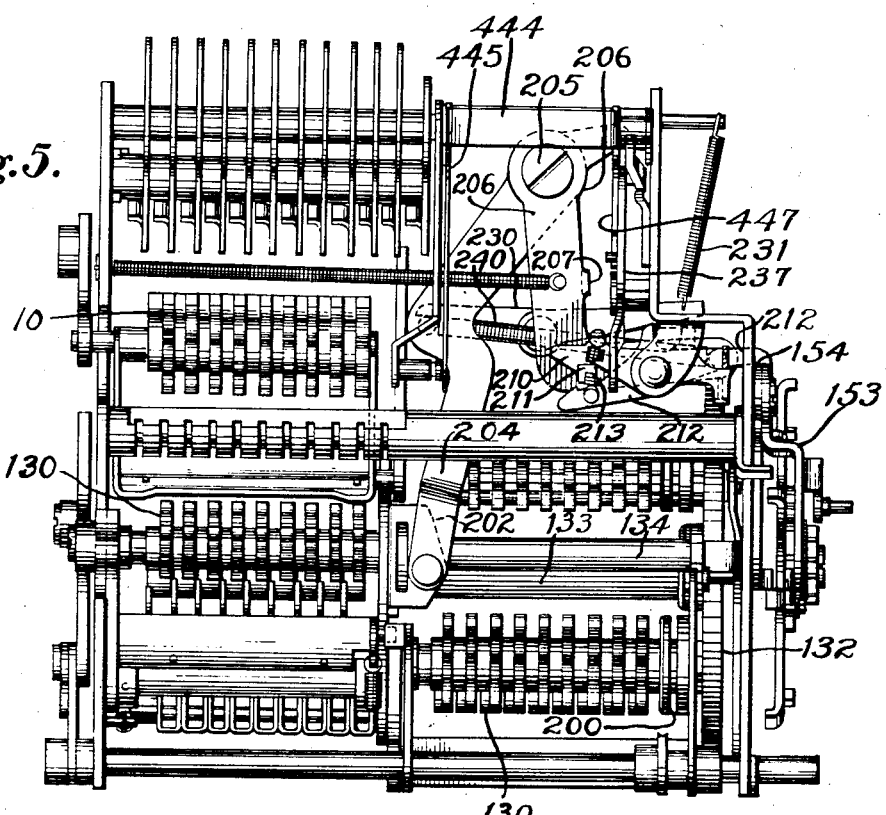
Fig. 5 is a partial section on the line 5—5 of Fig. 1 looking rearward and showing one of the registers out of the register magazine and in active position relative to the actuator racks.

After the register magazine has been indexed, the indexed register is automatically moved from the magazine into active position relative to the actuator racks, and subsequently returned to the magazine. This is accomplished by a power operated mechanism as follows:

Referring to Fig. 5, it will be observed that the right-hand collar of each register has an annular slot 200 in it. As each register reaches its indexed position, this slot passes over a lug 201 (Figs. 6 and 8) on a driving member 202. The driving member 202 is thus automatically connected to each register as the latter is indexed. This driving member is connected to one end of an arm 204 pivoted loosely on a shaft 205. Another and shorter arm 206 is also pivoted loosely on shaft 205 and arm 206 has a lug 207 overlapping the edge of arm 205 (Fig. 6). The arm 206 is urged clockwise as viewed in Fig. 6 by a spring 208, but it is normally prevented from moving by a latch 210 (Fig. 5) that engages over a square stud 211 on arm 206. A second latch 212 is adapted to cooperate with stud 211 as will presently appear and the two latches are urged toward one another by a spring 213.

The mechanism above described operates to automatically move the indexed register to active position relative to the actuator racks as soon as the register is indexed.

Figure 7:
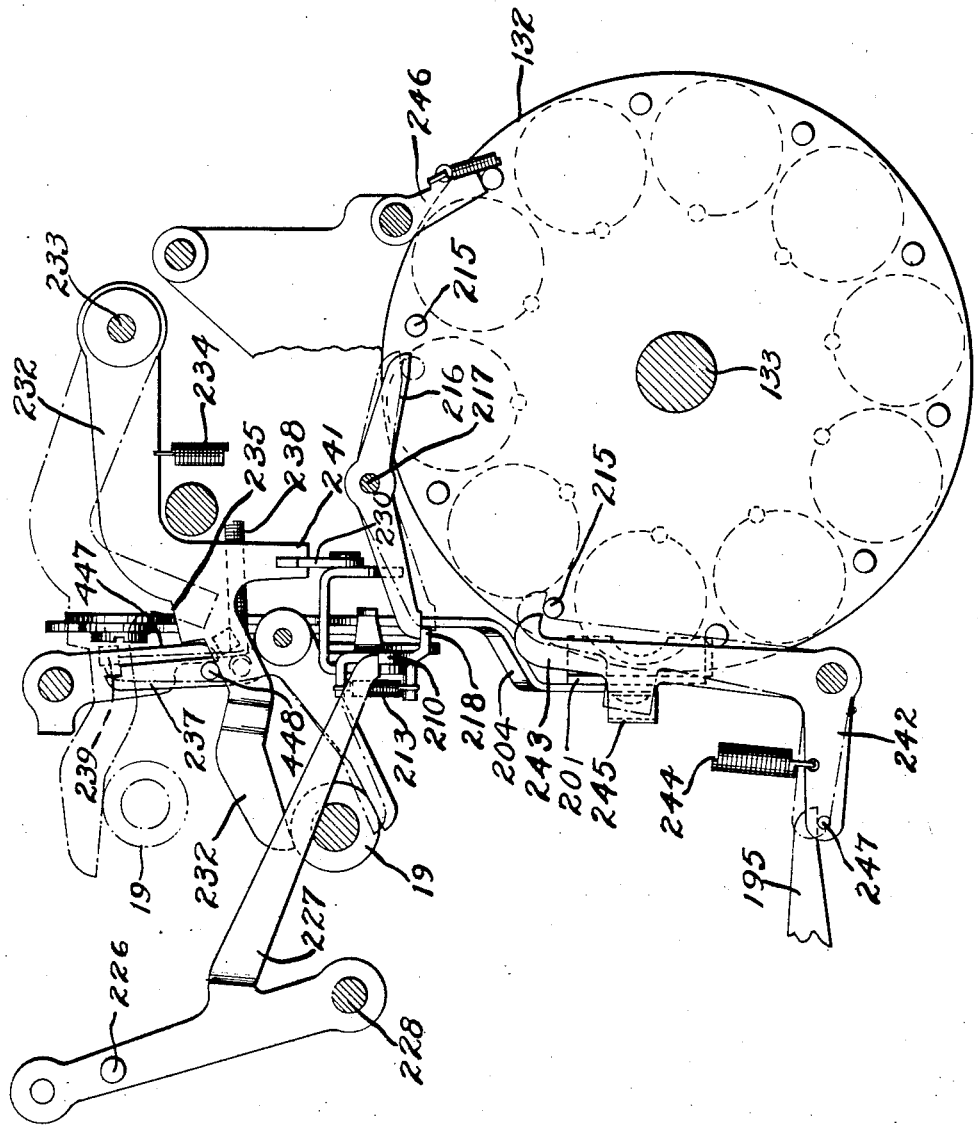
Fig. 7 is a detail right side elevation and section showing the register magazine and some of the controlling mechanism therefor.

Referring to Fig. 7, a series of studs 215 are carried by the register magazine, there being a stud between each two registers. As the magazine rotates clockwise during indexing, these studs pass under one end of a lever 216 pivoted on a stationary stud 217. The other end of lever 216 is positioned above a lateral lug 218 on the latch 210. As shown in Figs. 5 and 6, the right-hand end of latch 212 is positioned above the ends of the stop arms 153, 154. These stop arms are normally held in their upper position shown in Fig. 8 by the engagement of one of lugs 152 on arms 151 with the end of the respective stop arm 153 or 154. The latches 210 and 212 are thus normally held in the position of Fig. 8. But, when one of the register selection keys is depressed, the stop arms 153, 154 are moved out of engagement with the lug 152 whereupon the arms move downward to the position of Fig. 6. This frees the latch 212. Then, when the first of the studs 215 (Fig. 7) acts on lever 216 (Fig. 7), the latch 210 is rocked clockwise and the two latches move from their Fig. 8 to their Fig. 6 positions. The noses of the latches 210, 212 are offset slightly relative to one another so that, when the latches are moved from the Fig. 8 to the Fig. 6 position, latch 210 releases stud 211 on arm 206 which, thereupon, moves slightly to the left until stopped by latch 212 as shown in Fig. 6. Latch 210 cannot return to latched position because its nose is then above stud 211. The arm 206 is thus given a preliminary release as soon as the register magazine starts to move, in preparation for a final release when the register magazine reaches indexed position. As the register magazine reaches indexed position, the lug 152 in the appropriate arm 151 strikes one of the stop arms 153 or 154 and moves it upward. The end of the arm strikes the tail of latch 212 and rocks it counterclockwise which completely releases stud 211. The arm 206 is then moved to the left in Fig. 6, that is, to the dot-dash position, by its spring 208. Arm 206 carries arm 204 with it and the indexed register is automatically moved to active position, with the actuator racks 3.

From this, it will be seen that, when the register magazine is indexed by depression of one of the register selection keys, the indexed register will automatically move to active position adjacent the actuator racks as soon as the magazine is indexed.

As will be presently explained, the indexed register is automatically returned to the magazine after a calculating operation has been performed on it. It frequently happens that more than one calculation is to be performed on the same register. Under these circumstances, the register must be again returned to active position. In such event, the magazine is already indexed and one of the stop arms 153 or 154 is held in its upper position so that latches 210 and 212 occupy the position of Fig. 8. Since the magazine does not move from one index position to another, the studs 215 are not available to release latch 210 as above explained. Accordingly, the release of latch 210 is placed under the control of the multiple register motor bar.

Referring to Fig. 1, a multiple register motor bar 220 is provided, which will be described in more detail later. This bar has a stem 221 carrying a stud 222 positioned above a lever 223 pivoted at 224. The other end of this lever carries a pass-by pawl 225 adapted to engage a stud 226 on one arm of a bell crank lever 227 pivoted at 228. The other arm of this bell crank lever is positioned over the tail of latch 210 as will be clear from Fig. 7. When the motor bar is depressed, the latch 210 is rocked clockwise as viewed in Fig. 5 to the position of Fig. 6. Since latch 212 is held in released position by the respective stop arm 153 or 154, said latch will not move to the position of Fig. 6. Instead, the spring 213 will yield and the stud 211 on arm 204 will be completely released. In this manner, the register is automatically moved to active position upon depression of the multiple register motor bar.

The same action occurs when the main register motor bar is depressed. The stem 34 of this motor bar has a stud 229 on it which engages the lever 223 to operate the parts in the same way as when the multiple register bar is depressed.

After a calculating operation has been performed in a given register, the latter is automatically returned to the magazine near the end of the cycle of machine operation. When the lever 204 moves to the dot-dash position of Fig. 6, it is latched in said position by a latch 230 urged counterclockwise by a spring 231. The indexed register is then in the register frame in position for calculating operations. The register is moved forward and back on the driving member 202 when the register frame is rocked to engage the register pinions with the actuator rack, but the lug 201 remains in engagement with slot 200, the parts being proportioned to enable a relative movement to take place without causing a disengagement.

Referring to Fig. 7, the roller stud 19 on the dash-pot assembly is moved from the full to the dot-dash position and returned during each cycle of machine operation. This stud is positioned under one end of an arm 232 pivoted at 233 and urged counterclockwise by a spring 234. This arm has an abutment edge 235 (Fig. 7) adapted to engage the tail 236 (Fig. 6) of the arm 206. During the forward stroke of the machine, the roller 19 raises the arm 232 to the dot-dash position of Fig. 7 where the arm is latched by the bell crank-latch 237 that is urged clockwise by a spring 238 to move the latch under the stud 239 on arm 232 at the appropriate movement. During the latter part of the upward movement of arm 232, the abutment edge 235 engages the tail 236 of arm 206 and moves said arm from the dot-dash position of Fig. 6 to the position of Fig. 5, where the arm is latched by latch 210. This movement of arm 206 tensions a spring 240 connected between arms 206 and 204 and thus puts a tension on said spring tending to return arm 204 counterclockwise to its full line position of Fig. 6. But the arm 204 cannot move immediately because it is held by latch 230. The forced return movement of arm 206 also retensions spring 208.

As the roller 19 (Fig. 7) returns to normal, and near the final portion of its return movement, it engages the end of bell crank latch 237 and rocks it from the dot-dash position of Fig. 7 to the full-line position. This releases arm 232 which is quickly returned to its normal full-line position of Fig. 7 by spring 234. During the final portion of the return movement of arm 232, an abutment projection 241 on the arm strikes the tail of latch 230 and releases the latter, whereupon the arm 204 is immediately moved counterclockwise, as viewed in Fig. 5, to its Fig. 6 position. This automatically returns the register to the magazine. By having the latch 237 act through arm 232 to release latch 230, a sufficient time interval is obtained to permit progressive carries to take place.

From this, it will be clear that the operation of the machine tensions the springs 208 and 240 which act to move the register out of and into the magazine and that the register is automatically returned to the magazine after each cycle of machine operation.

It is desirable to positively lock the magazine against indexing movement when one of the registers is out of it. Referring to Fig. 7, a bell crank lever 242 is provided having a hooked end 243 adapted to engage over the studs 215 on the magazine plate 132. This lever is urged clockwise as viewed in Fig. 7 by a spring 244 and it has an angular lateral lug 245 shown in Figs. 7 and 8 which is adapted to engage a stud on the lower end of lever 204 (Fig. 8). When a register is in indexed position and in the magazine, the stud on lever 204 engages the lug 245 and the bell crank lever 242 is held in the full-line position of Fig. 7. But, as soon as the register is moved out of the magazine, the bell crank lever is released, whereupon it is rocked clockwise by its spring 244 to its dot-dash position of Fig. 7 where the hooked end 243 engages over one of the studs 215 of the register magazine to prevent movement of the latter in indexing direction. The movement of said magazine in reverse direction is prevented by a pawl 246 that engages behind the studs 215 (Fig. 7).

The locking lever 242 also controls the locking means for the register selection keys heretofore described. The lever carries a stud 247 positioned under the end of lever 195 (Fig. 1) which is fixed to the shaft 194 controlling the link 192 of the lock for the register selection keys. When a register is out of the magazine, bell crank lever 242 is rocked clockwise as viewed in Figs. 7 and 1, which rocks lever 195 counterclockwise and raises the link 192 to lock the register selection keys. When the register is returned to the magazine, the bell crank is rocked in the opposite direction which releases the lock for said keys. This means that, while a register is out of the magazine the magazine cannot be re-indexed and also that, after a register selection key has been depressed, no other register selection key can be depressed until the register first selected has been moved to active position, the machine given a cycle of operation, and the register returned to normal position.

Multiple register motor bar

A motor bar is provided for controlling operations in the multiple registers and, for purposes of convenience, it will be called the "multiple register motor bar" to distinguish it from the motor bar that controls the main register.

Figure 16:
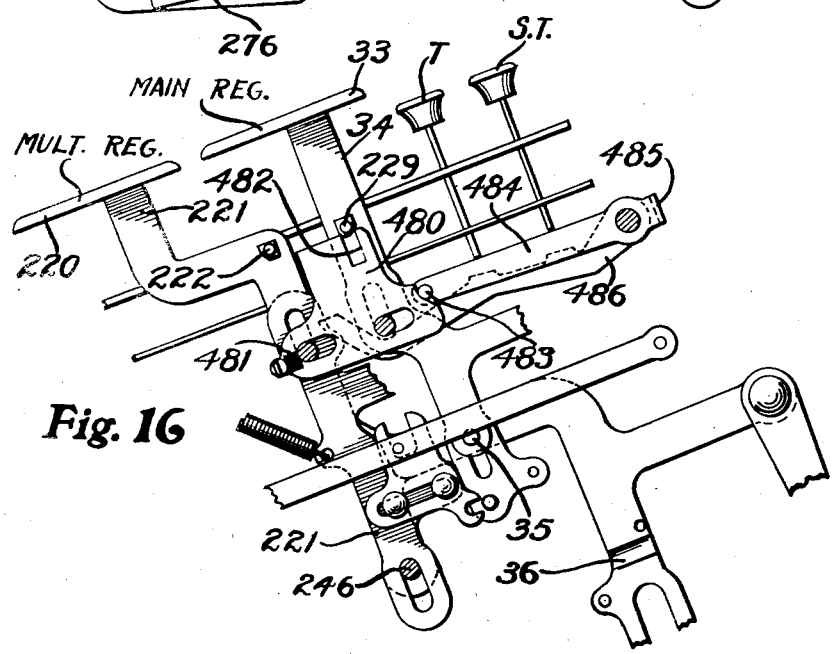
Fig. 16 is a detail right side elevation and section showing the motor bars and the motor bar interlock, as well as a coupling mechanism used in connection with negative total operations.

The multiple register motor bar 220 has a stem 221 slidably mounted on the side of the machine as best shown in Fig. 16. The lower end of the motor bar stem 221 engages over a stud 248 on the control plate 36 which, when moved downward, causes the motor to give the machine a cycle of operation as has heretofore been described. Accordingly, when the multiple register motor bar is depressed, the machine is given a cycle of operation to perform certain functions depending upon what control keys have been depressed. The multiple register motor bar also controls the conditioning of certain other parts of the machine as will hereinafter appear.

Addition in multiple registers

The machine is normally in condition to add in any indexed multiple register when the multiple register motor bar is depressed. Depression of the motor bar causes a cycle of machine operation and conditions the controls for the multiple register so as to rock the register into engagement with the racks at the appropriate time to perform addition.

As the machine is given a cycle of operation, the main drive shaft 4 and the plate 15 (Fig. 9) are first rocked counterclockwise from the position of Fig. 9 and then returned clockwise. The drive plate 15 carries a stud 250 which, near the end of the forward stroke of the machine, passes behind a shoulder on a pawl 251 (Fig. 11) mounted on a pitman 252. This pitman is connected through suitable crank arms and a link 253 to the cam 254 that controls the rocking of the frame 136 that receives the indexed registers from the magazine. At the beginning of the return stroke the stud 250 engages the shoulder of pawl 251 and moves the pitman 252 rearward to cause the cam 254 to move the indexed register into engagement with the actuator racks. Near the end of the return stroke of the machine another stud 255 on the plate 15 engages the hooked end 256 of an arm of the pitman 252 and returns the pitman forward to rock the cam 254 clockwise. This releases the register frame and enables it to be moved by its spring 257 to move the indexed register out of engagement with the actuator racks. These controls are similar to those used on the Burroughs portable and shown in Horton 1,853,050 and need not be described in further detail.

Although the machine is normally conditioned for addition in the main register such action does not occur when the multiple register motor bar is depressed as above explained. Referring to Fig. 22, the stem 221 of the multiple register motor bar carries a stud 258 adapted to engage a pivoted pawl 259 yieldingly connected by a spring 260 to a long link 261 which extends to the rear of the machine where it is yieldingly connected to the non-add lever 56. When the multiple register motor bar is depressed, the link 261 is thrust rearward to non-add the main register so as to insure that the item entered on the amount keys will be added only in the multiple register.

*Non-add key for all registers*

An item may be entered on the machine and printed without being entered in either the main register or the multiple registers, by depressing a non-add key NA and depressing the multiple register motor bar. Depression of the multiple register motor bar non-adds the main register as explained above.

Depression of the non-add key NA (Fig. 22) rocks a pivoted arm 262 downwardly. This arm carries a stud 263 positioned above the edge of another pivoted arm 264. The latter has a downwardly extending projection 265 adapted to engage the tail of pawl 251 to move the latter to inactive position relative to stud 250 (Fig. 11) on drive plate 15. The result is that, when the machine is operated, the indexed multiple register will not be rocked into engagement with the racks and no operations will occur in said register.

*Tens-transfer mechanism for multiple registers*

The tens-transfer mechanism for the multiple registers is substantially like that for the main register and it will not be described in detail.

It is positioned adjacent the frame into which the multiple registers are moved when they are moved out of the magazine. As each register is moved into the frame it moves to a position such that the tens-transfer mechanism is operative to effect transfers in the register if any need be made. The one tens-transfer mechanism thus serves all the multiple registers.

The multiple register tens-transfer mechanism is shown in the lower half of Fig. 26 where it will be seen that the parts are essentially the same as the corresponding parts in the tens-transfer mechanism for the main register. These parts are indicated by the same reference numerals with the exponent $m$.

*Subtraction in multiple registers*

Subtraction may be performed in any multiple register by depressing the subtract key and the multiple register motor bar.

When the subtract key "Subt." is depressed (Fig. 19), its stem engages one end of an arm 266 (Fig. 19b), pivoted on shaft 48, and rocks said arm counterclockwise against the tension of its spring. The arm has a lower projection 267 (Fig. 19) adapted to engage the upper edge of the arm 264 that disables the pawl 251. This means that the controls are conditioned so that the indexed multiple register will not be rocked into engagement with the racks at the beginning of the return stroke. The hooked end of arm 264 is also brought into the path of stud 250 so that pitman 252 will be pulled forward at the end of the forward stroke of the machine to move the multiple register out of engagement with the racks.

Depression of the subtract key also rocks the bell crank lever 41—44 (Fig. 19) counterclockwise. It will be recalled that this bell crank carries a stud 45 that normally blocks movement of the U-shaped member 46 that is urged clockwise in Fig. 19 by the spring 49. When the subtract key is depressed, the U-shaped member is released to index some of the controls of the main register for subtraction. The U-shaped member 46 is positioned in the path of a stud 270 on a pawl 271 urged clockwise in Fig. 19 by a spring 272. Pawl 271 has a shoulder 273 adapted to be positioned under the bent end of an arm 274 which is an integral extension of the stem 221 of the multiple register motor bar (Fig. 18). When the U-shaped member 46 is released by depression of the subtract key, it moves clockwise and releases pawl 271 which is thereupon moved so as to position its shoulder 273 under arm 274. Pawl 271 is mounted on a linkage 275 connected at its lower end to a pawl 276 on pitman 252.

If the multiple register motor bar is depressed with the parts in the above-described condition, the links 275 are moved downwardly to move the pawl 276 from the position of Fig. 19 to that of Fig. 27. With the pawl thus positioned, as the main drive plate 15 rocks counterclockwise, at the beginning of the forward machine stroke, the stud 255 engages the end of pawl 276 and pushes the pitman 252 rearwardly. This rocks the register controlling cam 254 counterclockwise and moves the indexed register into engagement with the racks.

Near the end of the forward stroke the stud 250 (Fig. 11) engages the hooked end of the arm 264 which, it will be recalled, was moved downward by depression of the subtract key, and thus pulls the pitman 252 forward to rock cam 254 clockwise to permit the register to be moved out of engagement with the racks. During the return stroke of drive plate 15, the pitman is not moved again as the pawl 251 is in inoperative position. Nor does the stud 255 engage the hooked end 256 of the arm of the pitman as the pitman is already in its forward position.

Depression of the multiple register motor bar after the subtract key has been depressed also causes the tens-transfer mechanism for the multiple registers to be placed in subtract condition. Connected to the links 275 (Fig. 19) is one end of a pivoted lever 277 whose other end is yieldingly connected to a bell crank lever 278 adapted to engage a stud 279 on an extension of bail 97$^m$ which controls the position of bail 95$^m$ that determines the add-subtract condition to the tens-transfer mechanism. When the multiple register motor bar is depressed, the lever 277 is rocked counterclockwise which rocks bell crank 278 clockwise to rock bails 97$^m$, 95$^m$, counterclockwise to subtract position.

In brief, the indexed register is rocked into engagement with the racks before they move, and out of engagement with them after they have been differentially positioned. The register pinions are thus rotated in a direction opposite to that in which they are rotated for addition. The controls for this operation are conditioned jointly by the depression of the subtract key and the multiple register motor bar.

Although depression of the subtract key also indexes some of the controls for the main register for subtraction, subtraction will not occur when the multiple register motor bar is depressed, because it requires depression of the main register motor bar to move said controls to subtract position. The main register is also non-added by depression of the multiple register motor bar as has already been explained.

Totals and subtotals from multiple registers

A total or a subtotal may be taken from any indexed multiple register by depressing the total or subtotal key and the multiple register motor bar.

It will be understood that, as far as engagement between the indexed register and the racks is concerned, the totaling operation is similar to a subtract operation. The register is engaged with the racks before they move and disengaged after they reach their differential positions. In totaling, however, the racks are positioned under the control of the register instead of the amount keys.

When the total key T is depressed (Fig. 18), its stem engages the arm 41 and rocks the bell crank 41—44 counterclockwise to release the U-shaped member 46 for clockwise movement. This releases the pawl 271 so that its shoulder 273 moves under the bent end of arm 274 on the stem 221 of the multiple register motor bar.

Depression of the total key also rocks the lever 266 (Fig. 19) counterclockwise and its projection 267 moves arm 264 to disable pawl 251.

Accordingly, when the total key is depressed, the controls for the multiple register are indexed and, then when the multiple register motor bar is depressed, these controls are moved to subtraction position so that the indexed register will be rocked into engagement with the racks at the beginning of the forward machine stroke and out of engagement with them at the end of said forward stroke.

The racks move to differential positions under the control of the register whose pinions must be arrested in "0" position for this purpose,—depression of the total key rocks the lever 110 (Figs. 15 and 19c) which has a rear downwardly extending projection 280 positioned in front of a stud 281 on an arm 282 fixed to a shaft 283. Another arm 284 is fixed to this shaft and the latter arm is adapted to rock a total locking bail 285 for the multiple register from the position of Fig. 15 to that of Fig. 18 to lock the tens-transfer pawls 64m for the indexed register against movement. These pawls then act to arrest the pinions in "0" position.

A subtotal is taken in the same manner as a total except that the register is not rocked out of engagement with the actuator racks for the return stroke of the machine.

Depression of the subtotal key ST rocks bell crank 41—44 the same as if the total key had been depressed. The controls are thus conditioned to rock the multiple register into engagement with the racks before the latter move. While lever 266 (Fig. 19b) is under the subtotal key, the parts are proportioned so that depression of said key does not move the lever far enough to disable the pawl 251.

Accordingly, during the first part of the forward stroke, the stud 255 acts on the end of pawl 276 to push the pitman 252 (Fig. 18) rearwardly to rock the register into engagement with the racks. The racks then rise under the control of the register pinions and the printing mechanism operates to print the subtotal. At the end of the forward stroke stud 250 engages the hooked end of arm 264 and moves pitman 252 forward to disengage the register from the racks but the pitman is immediately moved rearward again at the start of the return stroke by engagement of stud 250 with the shoulder on pawl 251. Near the end of the return stroke the stud 255 engages the hooked end 256 of the arm on pitman 252 to pull the pitman forward to rock the register out of engagement with the racks.

Transfer totals

A total may be transferred from any of the multiple registers to the main register by depressing a "total transfer" key and giving the machine a cycle of operation.

Referring to Fig. 27, the stem 290 of the transfer total key TT is positioned to engage a member 291 pivoted at 292. When the key is depressed, the member 291 is moved to the position of Fig. 27 where a lug 293 on it is positioned to block rearward movement of the link 261. This link 261 extends rearwardly, as shown in Fig. 22, to where it is yieldingly connected to the non-add lever 56 for the main register. When the link 261 is moved rearwardly the main register is non-added, but the member 291, when moved by depression of the transfer total key, prevents rearward movement of link 261 and thus insures that the main register will not be non-added. Since the main register controls are normally in add condition, it follows that, upon depression of the transfer total key, the controls for the main register are conditioned so that this register will be rocked into engagement with the actuator racks after they have been differentially positioned.

Depression of the transfer total key also rocks pivoted arm 262 (Fig. 27) downward. The free rear end of this arm carries a stud 263 positioned over the edge of arm 264 which is the arm that disables pawl 251. It follows that depression of the transfer total key disables the pawl 251 so that the indexed multiple register will not be rocked into engagement with the racks at the beginning of the return stroke of the machine.

The pivoted member 291 also has a downwardly extending branch 297 (Fig. 27) to which a link 298 is connected. This link extends rearwardly to a point where it is connected to the arm 282 that controls the total locking bail 285 that locks the pawls 64 in to block the multiple register pinions in "0" position for total taking.

Link 298 has a stud 299, about midway its length, positioned in front of one arm of a pivoted bell crank lever 300 whose other arm is connected to the links 275 that control the pawl 276 which, when rocked to the position of Fig. 27, is in the path of stud 255. The downward movement of links 275 also rocks lever 277 that controls the tens-transfer mechanism for the multiple registers.

It will thus be clear that, when the total transfer key TT is depressed, the controls for the indexed multiple register are conditioned for total taking while those for the main register are conditioned for addition. The machine may be given a cycle of operation by either motor bar but preferably by the multiple register motor bar because an appropriate character is printed if this bar is used, as will be later described, whereas the character is not printed if the other motor bar is used. When the machine is given a cycle of operation the selected multiple register is rocked into engagement with the racks before their movement and a total is taken from this register. After the actuator racks have been differentially positioned the multiple register is rocked out of engagement with the racks and the main register brought into engagement with them. During the return stroke of machine operation, the total is then transferred to the main register.

A special control of the actuator racks to insure against errors in the above operation is described under "Interlocks".

Simultaneous addition

Items entered on the amount keys may be simultaneously added in the main register and in any selected multiple register. This can be done by selecting the appropriate multiple register, entering the item on the keys, and by causing a cycle of machine operation by depressing both the multiple register and the main register motor bars simultaneously.

The two motor bars are mutually exclusive in their control of the main and multiple registers when either bar is depressed alone.

As already described, the stem 221 of the multiple register motor bar carries a stud 258 (Fig. 10) positioned above one arm of a bell-crank pawl 259 whose other arm is yieldingly connected by spring 260 to the link 261 which is connected to the non-add lever 56 for the main register. When the multiple register motor bar is depressed, the bell crank 259 is rocked clockwise which thrusts link 261 rearward to non-add the main register.

The stem 34 (Fig. 12) of the main register motor bar has a lateral lug 310 positioned over the end of one arm 311 of a U-shaped member 312 (Fig. 25) whose other arm 313 is fixed to the arm 262. Downward movement of arm 262 moves arm 264 downward and the latter disables pawl 251 to non-add the indexed multiple register controls.

While the two motor bars are thus mutually exclusive in their control of their registers, this condition can be changed if both bars are depressed simultaneously.

Referring to Fig. 12, the stem 221 of the multiple register motor bar carries a stud 314 which, when the multiple register bar is depressed, engages a beveled edge 315 (Fig. 25) on the edge of arm 311 of the U-shaped member 312. This cams the U-shaped member clockwise out of the path of the lug 310 on the stem of the main register motor bar. Accordingly, when the two motor bars are depressed simultaneously, the stud 314 disables the U-shaped member 312 in time to prevent disablement of the controls associated with the multiple register by depression of the main register motor bar.

When the main register bar is depressed, a stud 316 (Fig. 10) on the extension 51 of the stem of said bar passes down behind a lug 317 on the link 261 that is normally moved rearward upon depression of the multiple register motor bar to non-add the main register. But, when the two bars are depressed together, the stud 316 moves down behind lug 317 in time to prevent link 261 from being moved rearwardly by downward movement of the multiple register motor bar. The stud 258 (Fig. 10) on the multiple register bar stem 221 engages the bell crank pawl 259 but the connection between this lever and the link 261 yields without causing rearward movement of the link to non-add the main register.

From this, it will be seen that, when both the motor bars are depressed simultaneously, neither will disable the controls associated with the other and the machine will be left in condition for adding upon the main register and the indexed multiple register. Accordingly, any item entered on the amount keys will be simultaneously added in the main register and the selected multiple register.

Simultaneous subtraction

It is also possible to simultaneously subtract an item from the main register and any selected multiple register. This is done by depressing the subtract key and then depressing both the main register and the multiple register motor bars simultaneously.

Depression of the subtract key indexes both the controls for the main and the selected multiple register for subtraction. However, in operations where only one of the motor bars is depressed, subtraction occurs only in the register corresponding to the motor bar selected. This is because the subtraction controls are not completely conditioned by depression of the subtract key. The appropriate motor bar must be depressed to complete the conditioning. The two motor bars are thus mutually exclusive in subtraction operations also.

However, if both the motor bars are depressed simultaneously, the controls for both the main and the indexed multiple register are rendered operative, that is, the subtract key indexes the subtract controls in a preliminary manner for both registers and depression of both bars completes the conditioning of both sets of controls.

It follows therefore, that if, after an item has been entered on the amount keys, the subtract key is depressed, and both motor bars are depressed simultaneously, the item will be simultaneously subtracted from the main register and the indexed multiple register.

Simultaneous subtraction in main register with addition in any selected multiple register An item may be subtracted from the main register and simultaneously added into any selected multiple register by depressing an "add-subtract" key and the main register motor bar.

As previously explained, the machine is normally conditioned for addition in both the main and the indexed multiple register. When it is desired to perform addition in the multiple register at the same time as subtraction is performed in the main register, it will be clear that, as far as the multiple register is concerned, its controls are already in condition for addition. It is necessary, however, to condition the controls for the main register for subtraction and to also control the machine so that the controls for the multiple register will not be disabled by depression of the main register motor bar, as they normally would be.

Referring to Figs. 20 and 25, the stem of the add-subtract key 320 is positioned to engage an upstanding projection 321 on a pivoted arm 322. The rear end of this arm has a nose 323 that extends over a lateral lug 324 (Fig. 21) on the arm 41 of bell crank lever 41—44. This bell crank lever carries the stud 45 that controls the U-shaped member 46 which, in turn, controls the pawl 271. The indexing of the U-shaped member 46 and pawl 271 enables subtraction to be performed on the main register if the main register motor bar is depressed, and subtraction in the indexed multiple register if the multiple register motor bar is depressed. Since depression of the add-subtract key 320 releases the U-shaped member 46 and pawl 271, it follows that depression of said key indexes the controls for both registers for subtraction.

The rocking of lever 322 by depression of the add-subtract key also causes a projection 325

(Fig. 25) on said lever to be rocked into the path of lug 310 on the main register motor bar stem 34. When the motor bar is depressed, the lever 322 is rocked still further downward and thus rocks bell crank 41—44 still further. The movement is enough to cause the end of arm 44 to engage the projection 59 on non-add lever 56 to move said lever to a position to disable pawl 24. Depression of the motor bar also rocks lever 47 to move stud 53 (Fig. 19) away from the extension 54 to permit pawl 29 to move so that its notch 31 is over stud 18.

It follows, therefore, that, by depressing the add-subtract key, and by depressing the main register motor bar, the controls for the main register are conditioned for subtraction.

The add-subtract key also disables the U-shaped member 312 (Fig. 25) by rocking it clockwise. As shown in Fig. 25, the arm 313 of this U-shaped member has a beveled surface 330 positioned beneath the stem of the add-subtract key 320. When the latter is depressed, the U-shaped member will be cammed clockwise so that the end of arm 311 will be out of the path of the lateral lug 310 (Fig. 12) on the stem of the main register motor bar. When the latter is depressed, the controls for the multiple register will not be disabled.

Accordingly, when an item is entered on the amount keys, when the add-subtract key is depressed, and when the main register motor bar is depressed, the controls for the multiple register will be allowed to remain in addition condition so that addition will occur on the selected multiple register while the controls for the main register are conditioned for subtraction so that the item will be subtracted from the main register.

The multiple register motor bar cannot be depressed after the main register motor bar has moved downwardly owing to the fact that depression of the add-subtract key sets up an interlock that will be described later.

*Simultaneous subtraction from any selected multiple register and addition on the main register*

It is possible to subtract an item from any selected multiple register and simultaneously add it in the main register. This can be accomplished by entering the item on the amount keys, depressing the add-subtract key, and depressing the multiple register motor bar.

Since the machine is normally conditioned for addition, it is not necessary to change the condition of the controls for the main register as these are already in addition condition. However, the controls for the indexed multiple register must be conditioned for subtraction and depression of the multiple register motor bar must not disable the controls for the main register.

It will be recalled that, when the add-subtract key is depressed, the U-shaped member 46 (Fig. 20) is released and indexed in position to be operated by the main register motor bar. However, since the main register motor bar is not depressed under the conditions now assumed, the controls for the main register will not be conditioned for subtraction even though the add-subtract key has been depressed.

When the U-shaped member 46 is released, the pawl 271 is also released and it is then indexed under the lateral arm 274 of the stem 221 of the multiple register motor bar as shown in Fig. 21. The pawl 271 is pivoted on a stud carried by links 275 that control pawl 276. When the motor bar is depressed, the arm 274, pawl 271, and links 275 move downwardly. This will position the pawl 276 in the path of the stud 255 so that the multiple register will be rocked into engagement with the racks immediately upon the start of the cycle of machine operation. Depression of the add-subtract key rocks the U-shaped member 312 clockwise, as already described, which causes a shoulder 318 (Fig. 12) to be positioned in the path of a stud 314 (Fig. 21) on the multiple register motor bar stem. When the latter is depressed, the yoke 312 is moved downward and lever 262 (Fig. 21) is rocked downward. The latter, acting through stud 263 rocks arm 264 to disable pawl 251 and put the hooked end of arm 264 in the path of stud 250 so that the register will be disengaged at the end of the forward machine stroke.

Downward movement of pawl 271 also rocks the lever 277 which places the tens-transfer mechanism for the multiple register in subtract condition.

The U-shaped member 46 is indexed under the arm 51 under the conditions above described, but the controls for the main register are not indexed in subtraction position because the main register motor bar is not depressed.

Depression of the "add-subtract" key rocks the arm 322 (Fig. 20) downwardly as previously explained. This arm has a downward extending projection 331 in front of a stud 332 on the link 261 that controls the disabling of the controls for the main register when the link is moved rearwardly. When said arm 322 is rocked by depression of the add-subtract key, the extension 331 is held in front of the stud 332 so that the link 261 cannot be moved rearwardly upon depression of the multiple register motor bar. It follows that the controls for the main register are not disabled by depression of the multiple register motor bar.

From the description in the last two sections, it will be evident that addition can be performed in one register and subtraction in another by depressing the "add-subtract" key and operating the machine. The operator can selectively determine the operation by remembering the subtraction will be performed in the register corresponding to the motor bar depressed, that is, if the main register motor bar is depressed the item will be subtracted from the main register and added into the indexed multiple register, and if the multiple register motor bar is depressed, the reverse action takes place.

*Negative total from main register*

A true negative total may be taken from the main register in a novel manner as follows:

When a negative total occurs in the main register, a negative total lock is conditioned to lock the total and subtotal keys against operation. Referring to Fig. 29, the pinion of highest order of the main register has a wide faced tooth 340 adapted to engage a nose on a pawl 341 pivoted at 342, in the register frame. This pawl forms part of a bail 343 having another arm 344 carrying a stud 345 adapted to engage the end of a lever 346 pivoted at 347 and connected at its other end by a pin and slot connection to an arm 348 fixed to a shaft 349 that extends to the right hand edge of the machine. This shaft also carries an arm 350 engaging a lug 351 (Fig. 31) on a locking slide 352 which is normally urged forward by a spring 353. The locking slide has lugs 354 and 355 on it (Fig. 31) adapted to engage in slots in the total and subtotal keys, respectively, but in the normal position of the slide the lugs are not in the notches. The slide also has two lugs 356 on its edge forming a notch 357 in which the "credit balance" key stem may operate. In the normal position of the slide one of the lugs 356 is in a notch in the stem of the credit balance key so that said key is normally locked.

When a negative total occurs, the wide faced tooth 340 of the pinion of highest order moves from its "9" to or through its "0" position which rocks the pawl 341 clockwise from its dot-dash to its full line position of Fig. 29. This rocks lever 346 counterclockwise and moves the arms 348, 350 clockwise to move the slide to the full line position of Fig. 29 where the lugs 354 and 355 (Fig. 31) on the slide enter notches in the stems of the total and subtotal keys to lock them against operation, while the notch 357 moves into registration with the stem of the "credit bal" key to release it.

It follows from this that, when a negative total occurs in the main register, the total and subtotal keys are automatically locked and the credit balance key is released.

The negative total locking slide 352 (Fig. 31) has a projection 358 by means of which the slide may be moved rearward manually so that a total may be taken from a multiple register even though the negative total lock has locked the total key against taking a total from the main register. By pushing the slide rearwardly and depressing the total key, a total may be taken from a multiple register.

The first operation in taking a negative total is to depress the "credit balance" key which results in automatically selecting the No. 10 multiple register for credit balance operations. This register is reserved for this purpose and is always in clear condition.

As the "credit balance" key is depressed, its stem engages a lug on a pivoted bell crank bail 360 (Fig. 30) and rocks it from the position of Fig. 28 to that of Fig. 30. This bell crank carries a stud 361 adapted to engage an arm 362 of a latch 363 that normally holds a bell crank lever 364 in the position of Fig. 28. The bell crank lever 364 is urged clockwise as viewed in Fig. 28 by a spring 365. One arm of lever 364 bears against the arm 161 connected to link 160 that controls the multiple register selecting stops 153, 154 (Figs. 1 and 8). As the credit balance key is depressed, the latch 363 is moved to the position of Fig. 30 which releases the lever 364 whereupon the spring 365, which is stronger than the spring 170 (Fig. 2), moves lever 364 to the position of Fig. 30 and moves the register selecting link 160 and the stops 153, 154 to a position for selecting the No. 10 register. The register magazine then moves automatically to move the No. 10 register to indexed position and the register is automatically moved from the magazine into the register frame so that it is in position for operation.

The bell crank bail 360 is connected to a long link 370 that extends rearwardly and which is moved rearwardly when the "credit balance" key is depressed to condition the controls for the main register for total taking and those of the indexed multiple register for subtraction.

The main register controls are conditioned for total taking by the link 370 through connections including a stud 371 (Fig. 30) on one arm 372 of a bell crank lever whose other arm 373 carries a stud 374 positioned over the edge of bell crank 41—44 (Figs. 17 and 18) that controls the stud 45 (Fig. 20) that controls U-shaped member 46. When link 370 is moved rearward by depression of the "credit balance" key, the U-shaped member 46 is released and it indexes under the lateral projection on the main register motor bar stem 34 (Fig. 20). When said motor bar is depressed with the U-shaped member indexed as just described, the controls for the main register are conditioned as previously explained so that the main register will be rocked into engagement with the actuator racks before they move, and out of engagement with them after they have been indexed by the main register.

The controls are temporarily latched in total taking position by a latch 375 (Fig. 32). The latch moves under the urge of its spring 376 under a projection 377 (Fig. 32) on arm 372 of the bell crank lever 372—373 to hold the parts in total taking position. The latch is released when the main register motor bar returns to normal at which time the control plate 36 (Fig. 30) engages the tail of the latch to rock it clockwise to released position.

Rearward movement of the link 370 also places the printing mechanism in non-print condition. Referring to Fig. 30, the rear end of this link has a slot connection with the stud 371 on bell crank 372—373. A second link 378 also has a slot connection with stud 371. Rearward movement of link 370 also moves link 378 rearward through the medium of a stud 379 on link 370. The rear end of the link 378 is connected with an arm of a bell crank lever 380 which is pivoted on a support 381 to rock about a vertical axis. The other arm of this lever engages a stud 382 (Fig. 34) on a sliding yoke 383 which forms a part of the driving means for the printing mechanism. The yoke is slidably mounted on shaft 384 and is detachably connected to the printing mechanism through stud 385 (Fig. 32). The yoke is rocked by the stud 19 carried by bell crank 17 that is connected by link 16 to the main drive plate of the machine. When the link 370 is moved rearwardly by depression of the "credit balance" key yoke 383 is slid along the shaft 384 to disable the connection to the printing mechanism by disconnecting the yoke from stud shaft 385.

Referring to Figs. 32 and 32ᵃ, the bell crank 380 has a third arm connected to a link 386 which has a fork and stud connection with a stud 387 with the arm 114 which, as previously described, operates the total locking plate 118 for the main register. It follows from this that rearward movement of the link 370 not only disables the printing mechanism, but also moves the total locking plate for the main register in effective position.

The controls for the indexed multiple register are also indexed in subtract position by rearward movement of the link 370. As previously explained, rearward movement of this link releases the U-shaped member 46. The latter, in turn, releases the pawl 271 which is indexed under the lateral arm 274 (Fig. 19) of the stem 221 of the multiple register motor bar. It follows that, if the multiple register motor bar is depressed, the pawl 271 will be moved downwardly and such movement results in moving the links 275 to move the pawl 276 (Fig. 19) into the path of the stud 255. Also, the arm 264 is moved to disable the pawl 251 and the hooked end of arm 264 is positioned so as to move the register out of engagement with the racks at the end of the forward stroke of the machine. The movement of arm 264 is accomplished through movement of bell crank 372—373 (Fig. 30). The stud 374 on arm 373 rocks arm 266 (Fig. 19b) and the lug 267 of the latter moves arm 264.

Downward movement of pawl 271 also rocks lever 277 (Fig. 19) to put the tens-transfer mechanism in subtract condition.

In other words, the controls for the indexed multiple register are indexed in subtract position by depression of the "credit balance" key, and they are finally conditioned for subtraction by depression of the motor bar.

Rearward movement of link 370 also latches the main and multiple register motor bars together so that, no matter which one is depressed, the other one will be depressed also. Referring to Fig. 28, it will be observed that a slide 390 is mounted on studs on the stem of the multiple register motor bar. This slide normally occupies the position of Fig. 28 but it may be moved rearwardly to the position of Fig. 32 by means of a stud 391 on the link 370. When slide 390 is moved to its Fig. 32 position, a notch in said slide moves over a stud 392 on the main register motor bar. This latches the two bars together so that no matter which one is depressed the other moves down with it.

To summarize the description of negative totaling so far made, when a negative total occurs, the regular total and subtotal keys are locked and the credit balance key released. The credit balance key is then depressed which automatically selects the No. 10 register for operation, said register being automatically moved to active position. Depression of the "credit balance" key also disables the printing mechanism and sets the controls of the main register for total taking, said controls being completely conditioned at the time the motor bars are depressed. Depression of the credit balance key also sets the controls for the multiple register in position so that, when the motor bars are depressed, subtraction will occur in the indexed multiple register. Depression of the credit balance key also latches the two motor bars together so that no matter which one is depressed, both of them will move down. It follows that, if one of the motor bars is depressed after the credit balance key has been depressed, the machine will be given a cycle of operation during which a total will be taken from the main register and this total will then be subtracted from the indexed multiple register. This is accomplished by rocking both registers into engagement with the actuator rack before the latter move. When the racks move, they move under the control of the register pinions of the main register, which is thus cleared. At the time the total is taken from the main register, the latter contains the complement of the true negative total. It follows that this complement will be subtracted from the multiple register that has been indexed, namely, the No. 10 register. Subtraction of the complement from the indexed multiple register results in that register containing the true negative total. In order to obtain this total the machine must be given another cycle of operation and the total taken from the multiple register. The machine is automatically given a second cycle of operation without any attention on the part of the operator.

Referring to Fig. 32, when one of the motor bars is depressed, the control plate 36 is moved downward and the arm 39 is rocked clockwise to cause the motor to give the machine a cycle of operation. Under normal conditions, as the machine starts to operate, the stud 255 on the main drive plate moves upward from its Fig. 32 position and releases an arm 400 of a bell crank lever pivoted at 401. The other arm 402 of this bell crank lever carries a stud 403 positioned to engage the edge of the hooked latch 37. The bell crank 400—402 is urged clockwise by a spring 404 which is stronger than the spring 405 that urges the latch 37 clockwise. The result of releasing bell crank 400—402 during normal operations is, that the hooked latch 37 is moved out of engagement with the stud 38 so that arm 39 is free to return to normal and the machine will be given only one cycle of operation.

But, when the credit balance key is depressed, the parts are conditioned for two cycles. It will be recalled that depression of the credit balance key rocks the bell crank bail 360 and moves the latch 362—363 from the position of Fig. 28 to that of Fig. 32. This latch has a long rearwardly extending arm 406 (Fig. 32) positioned over the arm 400 of bell crank lever 400—402. When the credit balance key is depressed, the latch 362—406 holds the bell crank 400—402 from rocking clockwise and the latch 37 is not released. Accordingly, when the arm 39 is moved to position to cause a cycle of machine operation, it is latched in this position so that a second cycle will occur.

Since the motor bars are used to condition some of the controls, these bars must be latched in depressed position for both cycles of machine operation. Referring to Fig. 10, it will be observed that the motor bars carry studs 413 and 414, respectively, whose outer lower corners are beveled. Cooperating with the respective studs are latches 415 and 416 urged toward one another by a spring 417. These latches have cooperating projections 418 and the left hand latch has a tail 419 carrying a stud 420 adapted to engage in a notch in the end of an arm 421 (Fig. 32) which forms one arm of a bell crank 422 having another arm 423 extending downward. Pivoted on arm 423 is a bell crank yoke 424 having an arm 425 whose hooked end is adapted to be engaged by a stud 426 on control slide 36 as shown in Fig. 28.

When one of the motor bars is depressed, its stud 413 or 414, as the case may be, passes below the shoulder of its latch 415 or 416 and the motor bar is held depressed. This moves the latch momentarily but the movement is not enough to move the stud 420 (Fig. 28) out of the notch in arm 421. The same action takes place if both motor bars are depressed simultaneously, that is, both bars are latched down and the arm 419 is moved but not enough to disturb the position of stud 420.

The yoke 424 has a second arm 427 provided with a shoulder adapted to be engaged by a stud 428 on the slide 408. Normally, during a cycle of machine operation, the slide 408 is moved rearward and then returned forward. When the slide moves rearward, stud 428 moves to a position that permits yoke 424 to rock clockwise to position the shoulder on arm 427 in front of the stud. Then, when slide 408 moves forward, yoke 424 is carried forward which rocks yoke 422 far enough to cause its end to move the tail 419 of latch 412 and thus move both latches to release either or both the motor bars. As the motor bars are released control slide 36 moves upward and stud 426 engages the hooked end of arm 425 to rock yoke 424 to release arm 427 from stud 428, whereupon spring 429 restores yoke 422 and associated parts to normal.

In other words, normally, when one of both of the bars is depressed, it, or they, is temporarily latched depressed but is released during the cycle of machine operation.

But, when the credit balance key is depressed the stem of said key rocks the bell crank bail 360 and the stud 361 on this bail engages an arm of bail 424 (Fig. 32) and rocks this bail so that the end 425 of yoke 424 (Fig. 28) is out of the range of stud 426. It follows that, as long as the credit balance key is held depressed, the latches for the motor bars will not be released and these bars will be held down. During the latter part of the first cycle of machine operation in a negative total operation, the credit balance key is released and when it rises, the bail 360 is released so that yoke 424 can move to normal, but the motor bars remain latched down because this occurs too late in the first cycle. The slide 408 has already been moved forward and stud 428 can no longer pick up arm 427.

The motor bars are released during the next or second cycle of machine operation. During the second cycle the credit balance key being then in normal position the stud 428 picks up the arm 427 and operates the parts to release the motor bars in the manner above described.

For the second cycle of machine operation, the controls for the main register must be disabled and those for the lower or multiple register must be placed in total taking condition in order that the true negative total may be taken from the No. 10 register.

Referring to Fig. 32, it will be observed that the long link 370 that is moved rearwardly by depression of the credit balance key, carries a stud 430 adapted to engage a shoulder on a pawl 431, pivoted on the end of a lever 432 whose other end engages the stud 281 in arm 282 which controls the total locking plate for the pinions of the indexed multiple register. The link 370 is returned forward when the credit balance key is released near the end of the first machine cycle and, at that time, the stud 430 engages the shoulder on pawl 431 and moves the pawl forwardly to rock the arm 282 to move the locking plate 285 to locking position shown in Fig. 33. The multiple register total locking plate is thus moved to locking position near the end of the first cycle of machine operation, that is, prior to the second cycle during which a total is to be taken from the multiple register.

When the credit balance key returns to normal near the end of the first cycle, the link 370 returns forward to normal which also releases link 378 for like return. This returns the printing mechanism to normal for the second cycle of machine operation. The movement of these links takes place without disturbing the position of bell crank 372—373 because of the pin and slot connections of the links with stud 371 (Fig. 30). The function of bell crank 372—373 in controlling the controls for the multiple register is thus not disturbed.

The return movement of link 370 also moves a member 433 (Fig. 33) on the end of lever 432 so as to move the U-shaped member 46 out of indexed position with reference to the main register motor bar. The movement of U-shaped member 46 is not enough to release the pawl 271 which remains in indexed position as shown in Fig. 33 so that the controls for the multiple register remain in condition to rock the multiple register into engagement with the racks before they move, and out of engagement with them after they have been indexed under the control of the register.

The release of the U-shaped member 46 permits the controls for the main register to return to normal, that is, lever 47 (Fig. 19) is restored clockwise to normal which causes its integral arm 52 to move stud 53 against extension 54 and thus rock pawl 29 until its notch 31 is out of engagement with stud 18. At the same time bell crank 41—44 is held in its counterclockwise position by stud 374 on bell crank 373—374, the latter being held in position until the end of the second cycle of machine operation. Because bell crank 41—44 is held in said position the non-add lever 56 will hold pawl 24 out of engagement with stud 18. Thus the main register is prevented from engaging the actuators during the entire second cycle of operation.

Forward movement of the link 370 also releases the total locking plate for the main register which was conditioned during rearward movement of the link. The tens-transfer mechanism is also returned to add condition by the rocking of lever 47 back to normal.

The forward movement of link 370 also disconnects the two motor bars by moving the slide 390 (Fig. 32) forward so that, when the motor bars are released, they will be free for independent operation.

The bell crank latch 375 for latching the main register controls in total taking position (Fig. 32) is released when the motor bars return to normal at which time the control plate 36 engages the arm of the latch 375 to release it.

From this it will be clear that, during the second cycle of machine operation, a total is taken from the multiple register but no calculating operations are performed in the main register which is clear. Since the multiple register contains the true negative total, the resulting total will be the true negative total.

The credit balance key is restored to normal during the latter part of the first cycle of machine operation by the control shaft, or bail, 407 (Fig. 28) which is rocked during each operation of the machine as described in detail in the Horton patent heretofore referred to. This bail is urged rearward by a spring, not shown, but normally held forward by a slide 408 which is, in turn, held in position by the stud 255 on the main drive plate. The slide 408 is mounted to reciprocate on a stud 409 about which it may also turn. A spring 410 urges the slide rearwardly and tends to turn its front end clockwise about the stud 409. When the stud 255 moves away from slide 408 the latter moves rearward and the shaft 407 moves rearward far enough to return member 364 to normal, but said member is not latched in position owing to the fact that the bell-crank latch 360 is still held disabled by the credit balance key. The result is that, as soon as shaft 407 is swung forward again, the member 364 returns to its Fig. 30 position. During rearward movement of slide 408 its front end swings upward until its shoulder 411 is positioned behind a roller on shaft 407. During the latter part of the cycle of machine operation, the stud 255 engages slide 408 and moves it forward which moves shaft 407 forward far enough to release such keys as have been depressed, after which shaft 407 moves backward slightly as the shoulder 411 moves down to allow the shaft to seat against an upper shoulder 412.

The release of the credit balance key as above described, and its movement to normal, frees the bell crank 360 and the latter, in turn, frees the bell crank 363—406, but the latter cannot return to normal owing to the fact that the member 364 occupies the position of Fig. 32 where its end blocks counterclockwise movement of bell crank 363—406. This prevents the bell crank 400—402 from rocking clockwise to release the latch 37 to stop the cycling of the machine. In addition, the bell crank 400—402 is prevented from moving clockwise by stud 255, which, when it returns to normal engages a projection on the bell crank arm 400 (Fig. 28) so that the latter is held against clockwise movement.

During the forward stroke of the next, or second cycle, the shaft 407 moves rearward, as just described, and restores member 364 to normal where it is latched by bell crank 363, which was freed at the end of the first cycle by the release of the credit balance key.

It is necessary that the No. 10 register remains indexed for operation during both the cycles just described and this is accomplished as follows:

Referring to Fig. 28, a latch 440 is pivoted on the shaft carrying bell crank 363—406, said latch being urged clockwise by a spring 441 and limited against the bell crank 363—406 by a lug 442. The forward end of the latch has a hooked and notched end adapted to engage over a stud 443 on the register index arm 161. When the credit balance key is depressed, the bell crank 363—406 moves clockwise and the latch 440 follows so as to be in position to move over the stud 443 when the arm 161 is swung forward. It will be recalled that this arm is also moved forward upon depression of the credit balance key. The result is that, upon depression of the credit balance key, the index arm swings forward to its No. 10 position where it is latched.

During the first credit balance cycle, the bell crank 363—406 does not restore to normal for reasons already given and hence the latch 440 remains in position so that it holds the index arm 161 in its forward No. 10 position. But, during the second cycle of operation, the bell crank 363—406 is released and it moves counterclockwise to normal which carries the latch 440 counterclockwise and releases the arm 161 which is thereby freed for return rearward to index the register magazine in the position it occupied prior to the credit balance operations. The arm does not immediately move forward because of the interlock heretofore described that prevents movement of the register magazine while a register is out of it. But, near the end of the second credit balance cycle, and after the No. 10 register has been returned to the magazines, the arm 161 swings rearward.

It will be recalled that, in the normal operation of the machine, the register that has been indexed is returned to the magazine immediately after the machine is given a cycle of operation. But it is not desirable to return the No. 10 register to the magazine after the first credit balance cycle and means has been provided to automatically prevent this.

Referring to Fig. 5, a yoke 444 is provided having a downwardly extending arm 445 shown in Fig. 32. This arm is positioned in front of a stud 446 carried by the link 386 which, it will be recalled, is moved forward during the first credit balance cycle (Fig. 32ª). Forward movement of link 386 rocks the yoke 444 clockwise and results in moving another arm 447 of this yoke (Fig. 5), in a corresponding direction. This arm 447 is adapted to engage a stud 448 (Fig. 7) on the bell crank latch 237. It will be recalled that this latch normally holds the arm 232 in its upward position until near the end of a cycle of machine operation when the latch is released and the arm moves downwardly suddenly to operate certain parts that cause the active register to be automatically returned to the magazine. But, when the arm 447 of yoke 444 engages the latch 237, as it does during the first credit balance cycle, the latch is held in disengaged position with the result that, when the roller 19 moves downwardly (Fig. 7), the arm 232 follows with it and thus moves downwardly slowly and does not operate the parts that cause the register to be returned to the magazine. To put it another way, the arm 232 is "walked out" and is not active to perform its normal function as when it is suddenly released.

An important advantage of the present construction is that, in this multiple register machine, a special register is selected automatically for a credit balance operation, after which the register magazine returns, not to its normal position, but to the position it occupied just prior to the credit balance operation. Operation of certain of the parts has already been described, and we will now explain how the register selection keys are controlled to cause the magazine to be indexed in its prior position.

Referring to Fig. 3, the register selection keys are locked in position by the slide 181. In order that they may be released this slide must be moved rearward. The bank of register selection keys is provided with a member 450 pivoted on the shaft 169, said member being similar to members for each of the banks of amount keys as described in the Horton patent heretofore mentioned. The members for the banks of amount keys have bifurcated ends which straddle the shaft 407 and are rocked to release the keys at the time the shaft is rocked forward near the end of a cycle of machine operation. But the member 450 for the bank of register selection keys does not have a lug on its forward side with the result that, when the shaft 407 moves forward, it does not rock the member 450 counterclockwise and hence does not release the latch plate 181 for the keys of the register selection bank. Accordingly, the register selection keys are not released at the end of the first cycle of a credit balance operation, or at the end of the second credit balance cycle, or, for that matter, at the end of any cycle of operation of the machine. The latch plate 181 is released only by depression of another register selection key and this can occur only when the plate is released from its lock heretofore described.

Because the member 450 does not have a front projection, means must be provided to keep it in normal position. This means consists of a crank 451 (Fig. 3), pivoted on shaft 169 and urged counterclockwise by a spring 452 until it strikes the cross member 453. In this position a lug 454 on crank 451 engages member 450. The member 450 is provided with the usual lug 455 at its upper end which is constantly engaged with the forward end of the slide 181 and therefore positions the slide in normal position against the tension of its spring 185 (Fig. 2).

From the above it will be clear that, when the register selection arm 161 (Fig. 32) is released during the second credit balance cycle, and after the No. 10 register has been returned to the magazine, said arm and associated parts will move to a position determined by the register selection key that was depressed prior to the credit balance cycle.

*Negative total from multiple registers*

It is possible to take a true negative total from each of the multiple registers by transferring the negative total to the main register and then taking a negative total in the above described manner.

When a negative total occurs in one of the multiple registers, the register shows the complement rather than the true total. By depressing the transfer total key and giving the machine a cycle of operation, this complement is transferred to the main register. The main register then contains the negative total the same as if this total had occurred in it in the first place. The true negative total can then be taken by the negative total operations heretofore described.

*Special character printing*

An improved mechanism has been provided for printing special characters to indicate what calculating function has been performed and in which set of registers it has occurred.

In view of the number of functions performed it is difficult to find enough distinctive characters to separately designate each function for each set of registers. In the present instance, only one character is used for each function no matter in which set of registers it is performed. This character is automatically printed in an appropriate column to designate the set of registers. For example, one character is used for indicating a total. If the total is taken from the main register, the total sign is printed immediately after and close to the total. If the total is taken from one of the multiple registers, the total sign is printed after the total but spaced a slight distance therefrom. The character indicating which of the multiple registers has been indexed is printed separately and appears at the left of the total and spaced a considerable distance therefrom.

If a function such as addition or subtraction is performed in both registers, two characters appear side by side.

This arrangement enables a small number of characters to be used and thus avoids confusion. It also simplifies the printing mechanism.

Referring to Fig. 34, the row of control keys ST, T, Subt, etc., control the differential position of a stop bar 460 which is released for forward movement during each cycle of operation of the machine. This stop bar is connected to a blank sector 461 to which are connected two type bars 462 and 463 that are side by side and which carry characters such as illustrated in Fig. 35. These type bars are both positioned for printing at the same time in accordance with the control key that has been depressed. For example, if the subtract key has been depressed, both type bars will be positioned to print "subtract" characters.

The type bars are driven to printing position by hammers 464 and 465, there being a hammer for each type bar. These hammers are cocked and fired by latches 466 and 467 carried by the shaft 468. This shaft is rocked clockwise from its Fig. 34 position during each cycle of operation of the machine and released counterclockwise by the rocking of shaft 384. The latches 466 and 467 have shoulders 470 and 471, respectively, which are adapted to engage the tails of the hammers 464 and 465. The latches are urged clockwise about shaft 468 by springs 472. Assuming that the shoulders are in position to engage the tails, when the latches are moved clockwise with shaft 468 they rock the hammers 464 and 465 counterclockwise to tension the hammer springs. Near the end of the forward stroke of the machine these latches are cammed out of engagement with the hammer tails by a shaft or stud 473. This releases the hammers which are thereupon fired to drive the type bars against the platen.

But the latches 466 and 467 are not normally in position to engage the tails of the hammers. Instead, the latches are held in inactive position by bell crank levers 474 and 475, respectively. The forward arms of these bell crank levers engage studs 476 and 477, respectively, on the extensions 51 and 274, of the stems of the main and multiple register motor bars, respectively. The bell cranks are urged clockwise by springs 478. As long as the motor bars are in their upper undepressed positions, the bell crank levers are held by their springs in the position of the lever 475 in Fig. 34 and the latches 466 and 467 are in inactive position. But, when one of the motor bars is depressed, the bell crank 474 or 475 corresponding to it is rocked counterclockwise. This releases the corresponding latch which thereupon is moved to active position by its spring. Accordingly, the hammer for the set of registers corresponding to the motor bar depressed will be fired during the machine cycle and the character for the function performed will be printed in the corresponding column.

If both motor bars are depressed both latches will be rendered active, and both hammers fired to print characters in both columns.

The printing of a credit balance symbol CR is controlled by a member 479 (Fig. 28) which is pivoted on the same shaft as register index lever 161 and which straddles the bail 162 that moves with said index lever. The rear end of member 479 is adapted to be positioned in front of the end of the index bar 460 of the bank of control keys. It is moved to this position when the register index arm 161 is moved to the No. 10 register position during a credit balance operation. The type bars are thus positioned to print CR when the machine is conditioned to take a negative total. No printing occurs during the first credit balance cycle but during the second cycle the hammer is fired to print the symbol CR.

*Selective action of motor bars*

Although the results obtained by depressing each motor bar separately and by depressing them together should already be clear, the results will be reviewed in order that the importance of this improvement may not be overlooked.

Although there are two sets of registers, namely, the main register and the multiple registers, there is only one set of control keys such as the total key, the subtract key, etc. The operator has only one set of control keys to manipulate and he then depresses the proper motor bar to get a selective action in one or the other or both sets of registers.

The machine is normally conditioned for addition and no control key has to be depressed to add an item. If the operator depresses the main register motor bar, the item will be added in the main register only and action in the multiple registers will be prevented. At the same time, the special character printing mechanism will be conditioned to print a special character in the proper place to indicate that the item has been added in the main register. If the multiple register motor bar is depressed, the item will be added in the indexed multiple register only and a special character printed to indicate in which register it has been added. If both motor bars are depressed, the item will be added in both the main and the indexed register and appropriate characters printed.

If an item is to be subtracted, the operator depresses the subtract key. If he then depresses the main register motor bar the item will be subtracted from the main register only and an appropriate character printed. If he depresses the multiple register motor bar, the item will be subtracted from the indexed multiple register only and an appropriate character printed. If he depresses both motor bars, the item will be simultaneously subtracted from both registers and appropriate characters printed.

If a total is to be taken, the operator depresses the total or subtotal key as the case may be. If he then depresses the main register motor bar, a total will be taken from the main register only and an appropriate character printed. If he depresses the multiple register motor bar, a total will be taken from the indexed multiple register only and an appropriate character printed.

If he wishes to add in one register and subtract in another, he depresses the "add-subtract" key. He then depresses either the main or the multiple register motor bar, remembering that subtraction will be performed in the register corresponding to the motor bar depressed and that addition will be performed in the other register. Appropriate characters are printed in either case.

Interlocks

Numerous interlocks are provided to insure proper operation of the machine. Some of these have already been described and others are as follows.

When the total or subtotal key is depressed it should be impossible to depress both motor bars because totals or subtotals cannot be taken from both the main and the multiple registers at the same time. A slide 480 is provided (Fig. 16) which is urged to the right by a spring 481. When in normal position, this slide does not interfere with depression of the motor bars as it is out of the path of stud 222 on the stem of the multiple register motor bar and a slot 482 is immediately beneath the stud 229 on the main register motor bar stem. The rear edge of the slide 480 forms a cam with which a stud 483 engages. This stud is carried by an arm 484 integral with a pivoted yoke 485. The yoke has another arm 486 positioned beneath the stems of the total, the subtotal, and the "add-subtract" keys. When one of these keys is depressed, the yoke 485 is rocked counterclockwise which cams slide 480 forward to a position between the two studs 222 and 229 on the two motor bar stems. The slide is slightly wider than the distance between the studs 222 and 229 and the rear upper corner of the slide is beveled as shown in Fig. 16. If an attempt is made to depress both motor bars at the same time, the stud 229 will engage the beveled corner of slide 480 and lock it tightly against stud 222. Stud 229 cannot, of course, pass down along the side edge of the slide 480 and the movement of the slide to the left far enough to permit this is blocked by the engagement of the slide with the stud 222. The harder both bars are depressed the firmer the interlock.

This interlock also prevents depression of one motor bar after the other is depressed in total, subtotal or "add-subtract" operations. Assuming that the total, subtotal or "add-subtract" key is depressed, the slide 480 is positioned between studs 222 and 229. If the main register motor bar is depressed its stud 229 engages the beveled corner of the slide 480 and cams the slide forward so that said slide is under stud 222. This blocks the multiple register motor bar against depression. If the multiple register motor bar is depressed first, its stud 222 moves down along the front side edge of slide 480. If an attempt is then made to depress the main register motor bar, the stud 229 engages the beveled corner of the slide but the slide cannot move forward and hence the main register motor bar is blocked against depression.

A novel construction has been provided for preventing undesired movement of the type bars during total, transfer total, and credit balance operations. In transfer totaling, the racks first move to differential positions under the control of an indexed multiple register. The multiple register is then rocked out of engagement with the racks and the main register rocked into engagement with them. In order that the racks may move to differential positions under the control of the multiple register, all the racks must be released. Accordingly, when they reach their differential positions they are held against further movement by the pinions of the multiple register. If this register should be rocked out of engagement with the racks before the main register is moved into engagement with them, the racks and their type bars would move to their "9" positions. To insure against this the following has been provided.

Each index or stop bar 2 (Figs. 1 and 27) in each order of the machine is provided with a zero stop 500 (Fig. 27) controlled by the control shaft 407 and by the slides 181 for the banks of keys. During a cycle of machine operation the slides 181 move forward to lock the keys and to control the zero stops. When an amount key in any bank is depressed, the zero stop for said bank is allowed to move to a position such that it will not interfere with the index bar for that bank. When the machine is given a cycle of operation, the index bars in the banks in which keys have been depressed are free to move to differential positions corresponding to said keys but, in the other banks, the zero stops move to position to prevent any movement of the index bars. When a total is taken, the depression of the total key prevents all the zero stops moving to position to block the index bars. Said bars are free to move under the control of the register.

A slide 503 is provided (Figs. 27 and 31) having cam lugs 504 on it positioned under the "Cr. Bal." key, the transfer total key, TT, and the total and subtotal keys, so that depression of any one of these keys will move the slide forward, the slide being urged rearward by a spring 505 (Fig. 27). The rear end of the slide has an upstanding lug carrying a stud 506 (Fig. 28) cooperating with the edge of bail 502 which bail has a notch 507 in it. Normally the bail occupies the position shown in Fig. 28 where the notch 507 is not in registration with stud 506. But when the slide 503 is moved forward by depression of the transfer total key, for example, the stud registers with the notch and the bail 502 may move slightly to the position of Fig. 27.

Consequently, during total-taking, or subtotal-taking, or total-transferring operations, that is, whenever the slide 503 is moved forward by depression of one of the control keys which cooperates with a cam lug 504, the forward movement of the latch plates 181 during the forward stroke of the machine cycle is limited by the bail 502 sufficiently to prevent the zero stops 500 from taking up positions in which they can limit the forward movement of the stop bars 2. If the bail 502 were permitted to occupy the position of Figure 27 during the entire operation of the machine, the actuator racks 3, and thus also the stop bars 2, would be released for movement to their "9" positions when the register or registers were disengaged from the actuator racks 3 near the end of the forward stroke of the machine cycle. To prevent the actuator racks from thus moving to their "9" positions from the positions at which they were arrested by the pinions of the register from which the total has been taken, provisions are made for enabling the zero stop members 500 to hold the stop bars 2, and thus the actuator racks 3, at the positions in which they are arrested by the pinions of the register from which the total is taken.

As shown in Fig. 27, each index bar has a series of notches 510 in its front lower edge. The zero stops 500 are positioned in front of the ends of the index bars when no movement of said bars is desired. These zero stops, however, have laterally bent ends that are adapted to cooperate with the notches 510 under certain conditions.

At the rear of the keyboard is a bell crank lever 511 pivoted at 512 and urged counterclockwise by spring 513. One arm of the bell crank is positioned in the path of the dash pot stud 18 so that the bell crank is rocked near the end of each cycle of operation of the machine. The other arm of the bell crank engages the rearward end of slide 503 (Fig. 27) in such a manner that when the bell crank 511 is rocked by the stud 518, the stud 506 on the slide 503 is moved forwardly of the notch 507 in the bail 502 and thus cams the bail 502 upwardly again to its position of Figure 28 where the downwardly projecting flange on the rear of the bail 502 is above the upwardly extending lugs on the rear ends of the latch plate 181. Consequently, when the slide 503 is shifted forwardly of its Figure 27 position by the ball crank 511, the bail 502 is lifted to release the latch plates 181 which are thereupon moved forwardly by their springs and, in turn, rock the zero stops 500 counterclockwise to engage the lateral lugs on the forwardly extending arms of the zero stops 500 with the notched portion 510 of the stop bars 2. The index bars 2 and their racks and print bars are thus held against movement after they have been differentially positioned. This occurs near the end of the forward stroke and is effective while the multiple register is being rocked out of engagement with the racks and until the main register is rocked into engagement with them. The dash pot stud moves away from bell crank 511 at the beginning of the return stroke and thus releases the parts for operation during said return stroke.

The slide 503 which controls the above blocking or latching mechanism for the index bars is moved by the "Cr. Bal." key, as well as by the transfer total key. The slide is first moved by depression of the credit balance key itself since the slide has a bent lug 504 (Fig. 32) engaged by the stem of the credit balance key. The slide is held in this position by said key stem during the first credit balance cycle. During the second cycle the slide is held by a stud 516 on member 364 (Fig. 32). The index bars are thus held at the appropriate time while the complement of the negative total is being subtracted from the main register and inserted in the indexed multiple register.

The slide 503 is also moved by the total and subtotal keys, suitable bent lugs being provided on slide 503 for this purpose.

There is also an interlock to prevent rotation of the motor clutch shaft while the register magazine is being rotated from one position to another, even though a motor bar may be depressed. Referring to Fig. 28, when one of the motor bars is depressed, the control plate 36 is moved downwardly and, through latch 37, rocks the arm 39 clockwise. This arm 39 is pivoted freely on the clutch shaft 520 to which is fastened a crank 521 that is yieldingly connected by spring 522 with the arm 39. Downward movement of arm 39 is thus transmitted to shaft 520 through a yielding connection.

Pivoted at 523 is an arm 524 urged clockwise by a spring 525. This arm has a lug 526 (Fig. 1) resting against the underside of the index link 160 (Fig. 1). When link 160 is held upward by the index spider 146, as it is when the register magazine is indexed, arm 524 is positioned out of the path of crank 521. But, when the magazine is rotating and link 160 is moved to its lower position, arm 524 is moved counterclockwise into the path of crank 521 and thus prevents rotation of the motor clutch shaft even though one of the motor bars is depressed.

I claim:

1. A calculating machine having amount determining differential mechanism, a rotatable register support carrying a plurality of registers, means for moving said support in a given direction, a plurality of radial arms carried by said support, and indexing means for said support including a stop mechanism adapted to engage said arms so that said rotary support can be indexed from any indexed position to any other index position by movement in said given direction.

2. A machine of the class described having a plurality of multiple registers, indexing means for indexing said registers, means for giving said machine cycles of operation, and means operable after a register has been indexed to compel said machine to be given a cycle of operation before any other register can be indexed.

3. A machine of the class described having a differential mechanism, a plurality of multiple registers carried by a movable register support, means for indexing said support, means for automatically moving a register from said support to active position relative to said differential mechanism, and means operating to automatically lock said register indexing means after said support has been indexed and a register moved to active position until said register has been returned to said support.

4. A calculating machine having amount determining differential mechanism, a movable register support carrying a plurality of registers, means for indexing said support, each of said registers being movable relative to said support to an active position relative to said differential mechanism, and means controlled by said support and by said indexing means acting, as said support reaches a new index position, to automatically move the indexed register to active position relative to said differential mechanism.

5. A calculating machine having amount determining differential mechanism, a register magazine carrying a plurality of registers, each of said registers being removable from said magazine to an active position relative to said differential mechanism, means for indexing said magazine, and means controlled jointly by said magazine and by said indexing means acting, when said support reaches a new index position, to automatically move the indexed register from the magazine to active position relative to said differential mechanism.

6. A calculating machine having actuator racks, a rotatable register magazine carrying a plurality of registers, each of said registers being removable from said magazine to an active position relative to said actuator racks, means for indexing said magazine, and means controlled by said magazine and said indexing mechanism acting automatically, when said magazine reaches a new index position, to remove the indexed register from said magazine to active position relative to said racks, said means including portions acting automatically to return said register to said magazine after a cycle of operation of said machine.

7. A motor driven machine of the class described having a motor bar for causing said machine to be given a cycle of operation, amount determining differential mechanism, a plurality of multiple registers carried by a movable register support, means for indexing said support, power means for moving an indexed register from said support to active position relative to said differential mechanism and for returning said register to said support, and means operable, upon depression of said motor bar, to cause said power means to move the indexed register from said support to active position.

8. A calculating machine having amount determining differential mechanism, a movable register support carrying a plurality of registers, each of said registers being movable relative to said support to an active position relative to said differential mechanism, indexing means for said support, and means controlled jointly by said indexing means and by a manipulative member on said machine for automatically moving an indexed register to active position when said manipulative member is manipulated with said support in indexed position.

9. A motor driven calculating magazine having amount determining differential mechanism, a movable register support carrying a plurality of registers, each of said registers being movable relative to said support to an active position relative to said differential mechanism, an indexing means for said support, a motor bar for causing said machine to be given a cycle of operation, and means controlled jointly by said indexing means and said motor bar for automatically moving a register to active position when said motor bar is depressed with said support in an indexed position.

10. A motor-driven machine of the class described having a plurality of amount keys, a main register, a plurality of multiple registers, means for indexing said multiple registers, a main register motor bar and connections operable to condition certain elements of said machine to cause it to be given a cycle of operation during which an item entered on said keys is added in the main register, and a multiple register motor bar and connections operable to condition certain elements of said machine to cause it to be given a cycle of operation during which an item entered on said keys is added in the indexed multiple register, said motor bar connections being operable, upon depression of both motor bars, to cause the item to be added in both the main and multiple registers during the cycle of machine operation.

11. A motor driven machine of the class described having a plurality of amount keys, a main register, a plurality of multiple registers, means for indexing said multiple registers, a subtract conditioning means for conditioning certain elements of the machine for subtraction, a main motor bar and connections operable, upon conditioning said subtract means for subtraction and upon depressing said motor bar, to cause said machine to be conditioned and to be given a cycle of operation during which an item entered on said keys is subtracted from said main register, a multiple register motor bar and connections operable, upon conditioning said subtract means for subtraction and upon depressing said multiple register motor bar, to cause said machine to be conditioned and to be given a cycle of operation during which an item entered on said keys is subtracted from the indexed multiple register, said motor bar connections being operable, upon depression of both of said motor bars and upon conditioning said subtract means for subtraction to cause an item entered on said keys to be subtracted from both the main and the indexed multiple register.

12. A motor driven machine of the class described having a plurality of amount keys, a main register, a plurality of multiple registers, means for indexing said multiple registers, a main register motor bar and connections normally operable, upon depression of said bar, to cause said machine to be given a cycle of operation during which an item entered on said keys is added in said main register only, and manipulative means operable to set certain elements of said machine so that depression of said motor bar will condition elements of said machine and cause said machine to be given a cycle of operation during which an item entered on said amount keys will be subtracted from said main register and added in the indexed multiple register.

13. A motor driven machine of the class described having depressible amount keys, a main register, a plurality of multiple registers, means for indexing said multiple registers, a multiple register motor bar and connections normally operating, when said motor bar is depressed, to cause an item entered on said keys to be added in the indexed multiple register only, and a manipulative member on said machine operable, when manipulated, to condition certain elements of said machine so that depression of said multiple register motor bar will condition said machine and cause a cycle of operation during which an item entered on said keys will be subtracted from the indexed multiple register and added in the main register.

14. A machine of the class described having depressible amount keys, a main register, a plurality of multiple registers, means for indexing said multiple registers, an add-subtract manipulative member on said machine, a main register motor bar and connections, a multiple register motor bar and connections, and means controlled by said add-subtract member operable to condition certain elements of said machine to cause an item entered on said amount keys to be selectively subtracted from the main register and added in the index multiple register and vice versa depending upon whether the main or the multiple register motor bar is depressed.

15. A machine of the class described having a plurality of multiple registers, means for indexing said multiple registers, a main register capable of addition or subtraction whereby it may reach a negative or positive condition, a negative total conditioning means operable to condition certain elements of said machine to cause said machine, when operated to take a negative total from said main register by a series of operations involving use of a multiple register, and means operating as an incident to conditioning said machine for negative total taking to automatically select a predetermined multiple register for said negative total operations.

16. A machine of the class described having a plurality of multiple registers, means for indexing said registers, a main register capable of addition or subtraction whereby it may reach a positive or a negative condition, a negative total conditioning means operable to condition certain elements of said machine to take a negative total from said main register by operations involving the use of a multiple register, and means controlled by said negative total conditioning means operating automatically, when said negative total conditioning means is conditioned for negative total taking, to index a predetermined multiple register for said negative total operations.

17. A machine of the class described having a plurality of multiple registers, means for indexing said registers, a main register capable of addition or subtraction whereby it may reach a positive or negative condition, negative total conditioning means for conditioning certain elements of said machine to cause said machine, when operated, to take a total by a process of transfer operations employing a multiple register, means operating automatically when said machine is conditioned for negative total taking to index a predetermined one of said multiple registers for said negative total operations, and means operating automatically, after the negative total has been taken, to return to indexed position the register that was indexed prior to the negative total operations.

18. A machine of the class described having a plurality of multiple registers carried by a movable register support, means for indexing said support, a main register capable of addition or subtraction whereby it may reach a positive or a negative condition, negative total conditioning means operable to condition certain elements of said machine to cause said machine when operated to take a negative total from said main register involving operations using a multiple register, means operating automatically, when said machine is conditioned for negative total taking, to index said multiple register support to a predetermined position, and means operating automatically, after said negative total has been taken, to return said register support to the index position it occupied prior to the taking of the negative total.

19. A machine of the class described having a main register, a plurality of multiple registers, control keys operable to condition the machine to perform different functions, a special character printing mechanism for printing characters corresponding to the function for which the machine is conditioned, and means operable to automatically cause said characters to be printed in one column when operations are performed on the main register and to be printed in another column when operations are performed on one of the multiple registers and to be printed in both columns when operations are performed on both registers.

20. A motor-driven calculating machine of the class described adapted to be conditioned for a plurality of different calculating functions, three or more function-control keys for conditioning said machine for three or more different calculating functions, a main register, three or more multiple registers, means for selecting said multiple registers for operation, a main-register motor bar with connections for causing the machine to be given a cycle of operation, a multiple-register motor bar with connections for causing said machine to be given a cycle of operation, and means selectively conditioned by said function-control keys and selectively by said motor bars for conditioning certain elements of said machine so that, when operated in response to the depression of a selected motor bar, it will perform the function determined by the selected control key in either the main or the selected multiple register depending upon which motor bar is depressed.

THOMAS M. BUTLER.